(12) United States Patent
Sasaki et al.

(10) Patent No.: US 6,266,487 B1
(45) Date of Patent: Jul. 24, 2001

(54) MAGNETIC RECORDING AND REGENERATING UNIT FOR PHOTOGRAPHIC FILM AND CAMERA

(75) Inventors: Wataru Sasaki, Asaka; Minoru Ishiguro, Omiya; Akihiko Funaki, Asaka, all of (JP)

(73) Assignees: Fuji Photo Film Co., Ltd., Kanagawa; Fuji Optical Co., Ltd., Saitama, both of (JP)

( * ) Notice: Subject to any disclaimer, the term of this patent is extended or adjusted under 35 U.S.C. 154(b) by 0 days.

(21) Appl. No.: 09/366,644

(22) Filed: Aug. 4, 1999

Related U.S. Application Data

(62) Division of application No. 08/940,776, filed on Sep. 30, 1997, now Pat. No. 6,026,249.

(30) Foreign Application Priority Data

| Oct. 1, 1996 | (JP) | 8-261069 |
| Oct. 1, 1996 | (JP) | 8-261070 |
| Oct. 1, 1996 | (JP) | 8-261071 |
| Oct. 1, 1996 | (JP) | 8-261072 |
| Oct. 1, 1996 | (JP) | 8-261073 |
| Oct. 22, 1996 | (JP) | 8-279741 |
| Oct. 25, 1996 | (JP) | 8-284277 |

(51) Int. Cl.$^7$ ............... G03B 7/26; G03B 17/24; G03B 19/02
(52) U.S. Cl. ............... 396/277; 396/301; 396/319; 396/390
(58) Field of Search ............... 396/319, 277, 396/301, 390

(56) References Cited

U.S. PATENT DOCUMENTS

| 5,130,745 | 7/1992 | Cloutier et al. ............... 355/40 |
| 5,335,029 | 8/1994 | Itoh et al. ............... 354/106 |
| 5,412,444 | 5/1995 | Kazami ............... 354/106 |
| 5,434,634 | 7/1995 | Yoshida ............... 354/106 |
| 5,481,323 | * 1/1996 | Egawa et al. ............... 396/319 |
| 5,649,249 | 7/1997 | Yoshida ............... 396/319 |
| 5,727,240 | 3/1998 | Mizumoto et al. ............... 396/319 X |
| 5,729,778 | 3/1998 | Sasaki ............... 396/319 |
| 5,760,876 | 6/1998 | Farling et al. ............... 396/319 X |
| 5,815,752 | * 9/1998 | Tamamura et al. ............... 396/319 |

* cited by examiner

Primary Examiner—David M. Gray
(74) Attorney, Agent, or Firm—Sughrue, Mion, Zinn, Macpeak & Seas, PLLC

(57) ABSTRACT

A magnetic recording and Regenerating unit for photographic film and a camera, which feed photographic film coated with a magnetic recording layer, records magnetic information in the magnetic recording layer, and regenerates magnetic information from the magnetic recording layer. In the magnetic recording and regenerating unit for a camera, the number of turns of a coil wound around a core included in a magnetic head is small. Thus, one magnetic head is able to record and regenerate magnetic information. The number of turns of the coil is determined so as to output a regenerated waveform which does not enable reading of the magnetic information but permits determination of whether any magnetic information is recorded or not. Whether any magnetic information is recorded or not is determined based on the output voltage from a smoothing circuit, a peak hold circuit, etc. which receive signals output from the magnetic head via an amplifier.

8 Claims, 24 Drawing Sheets

F I G. 5
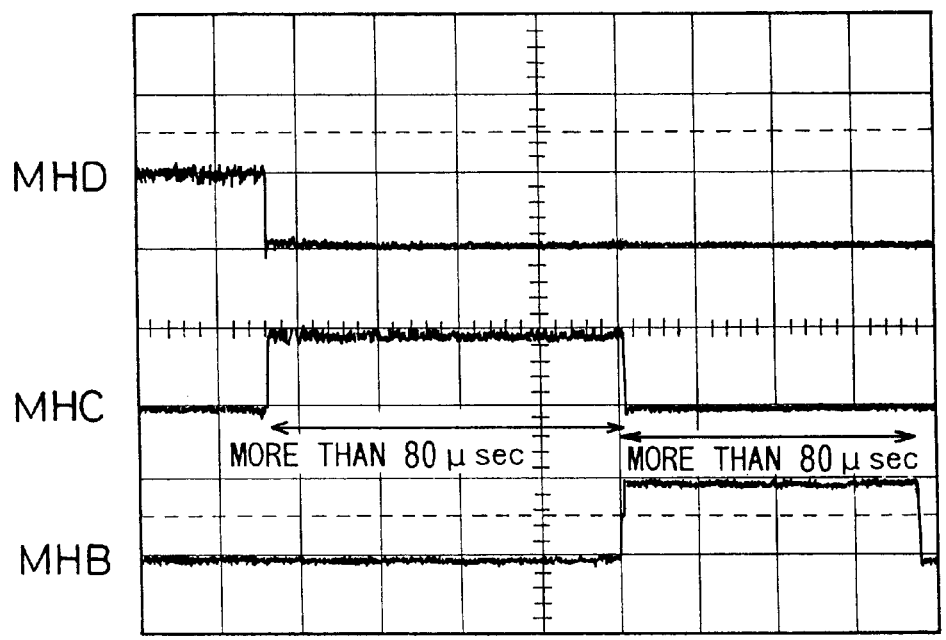
F I G. 6
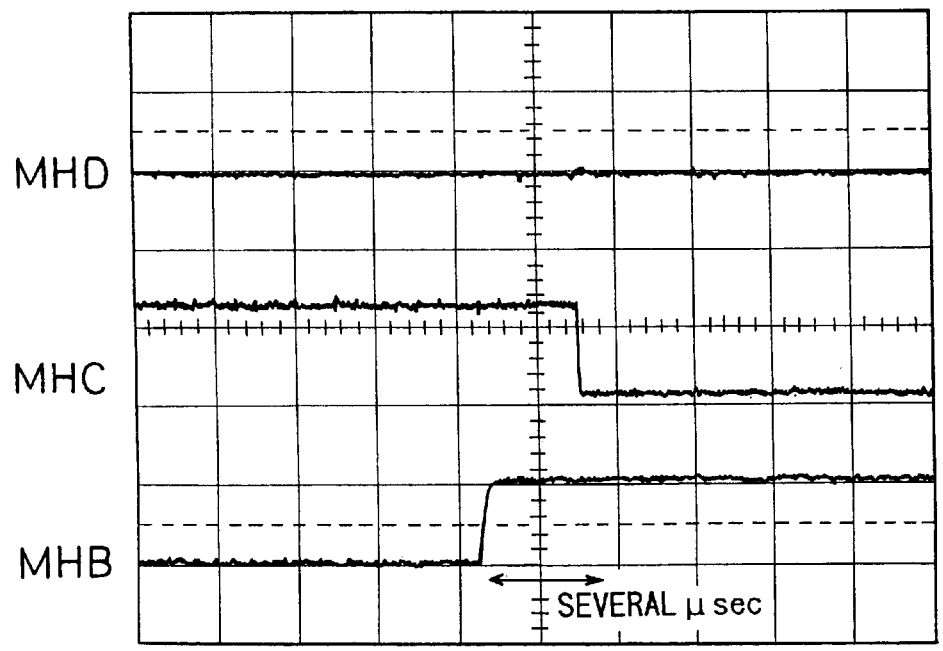

F I G. 8
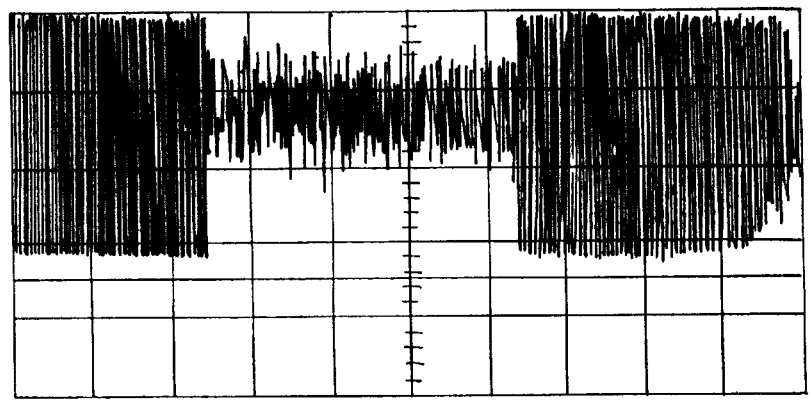
F I G. 9
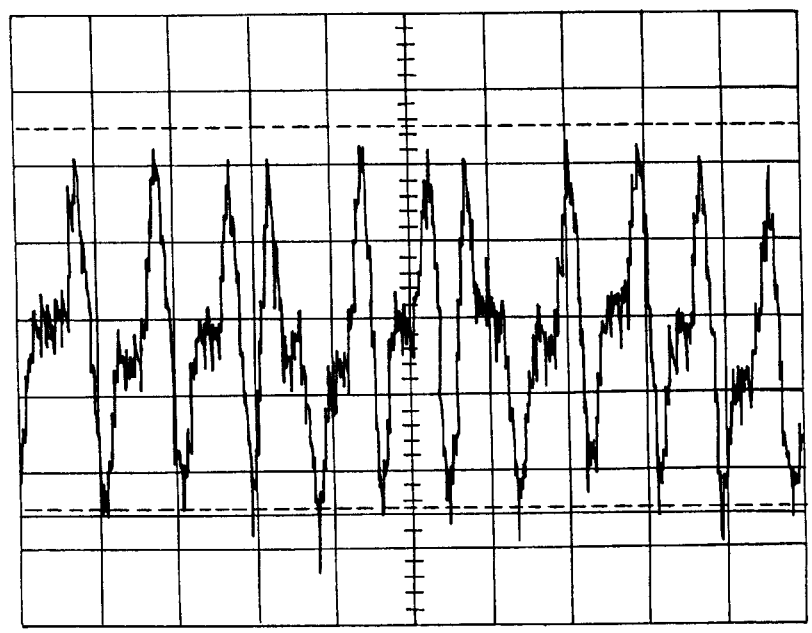

F I G. 1 2
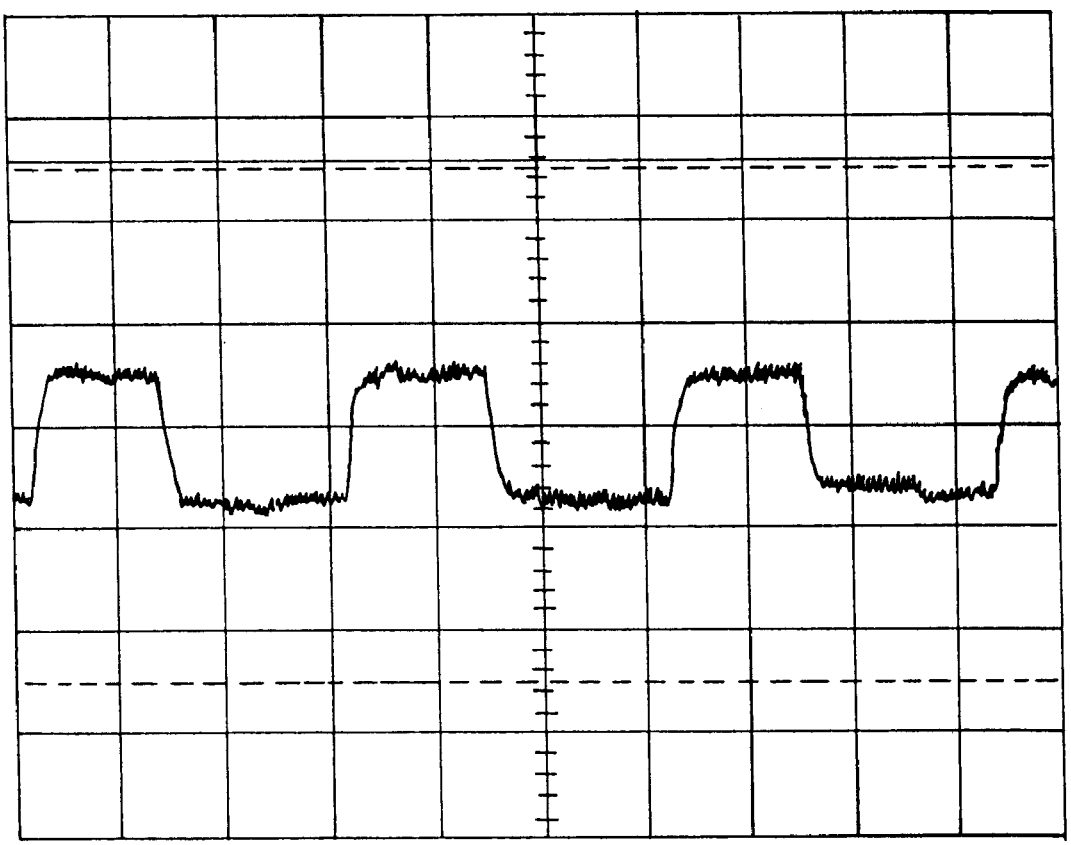

F I G. 1 3
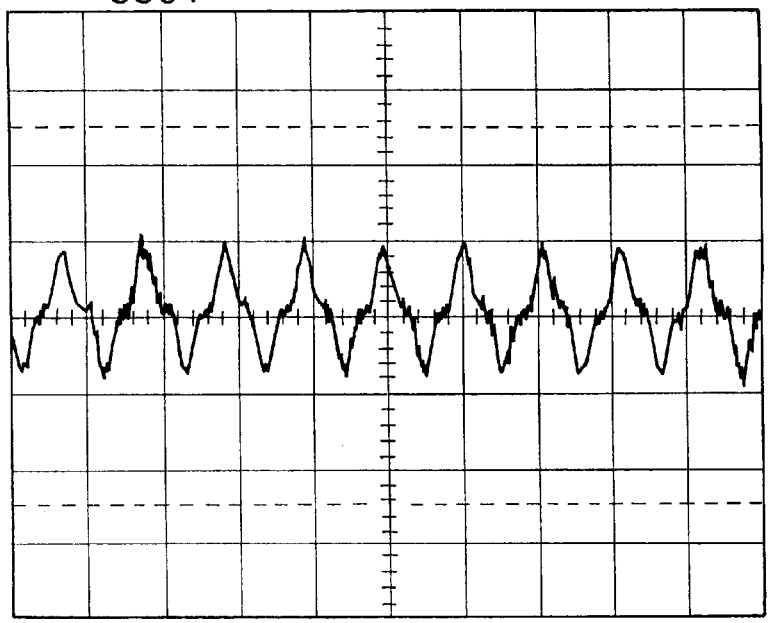
F I G. 1 4
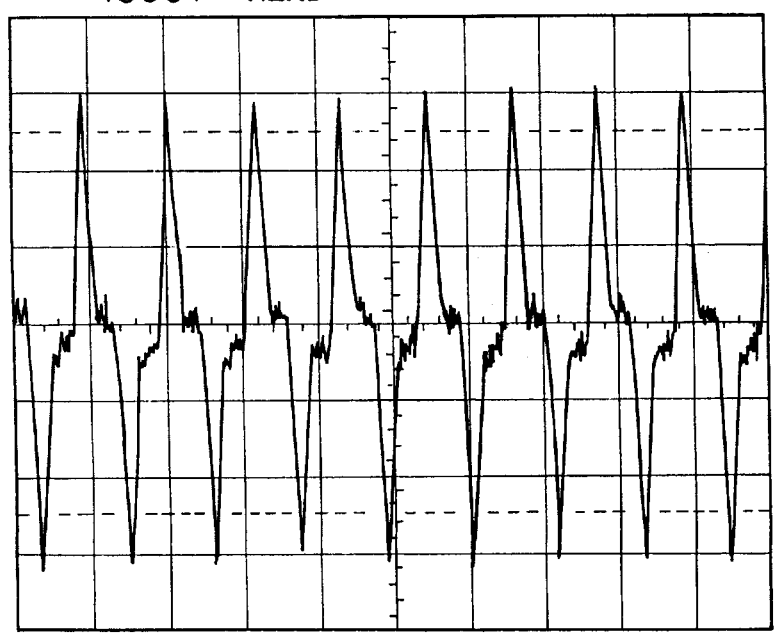

F I G. 2 7
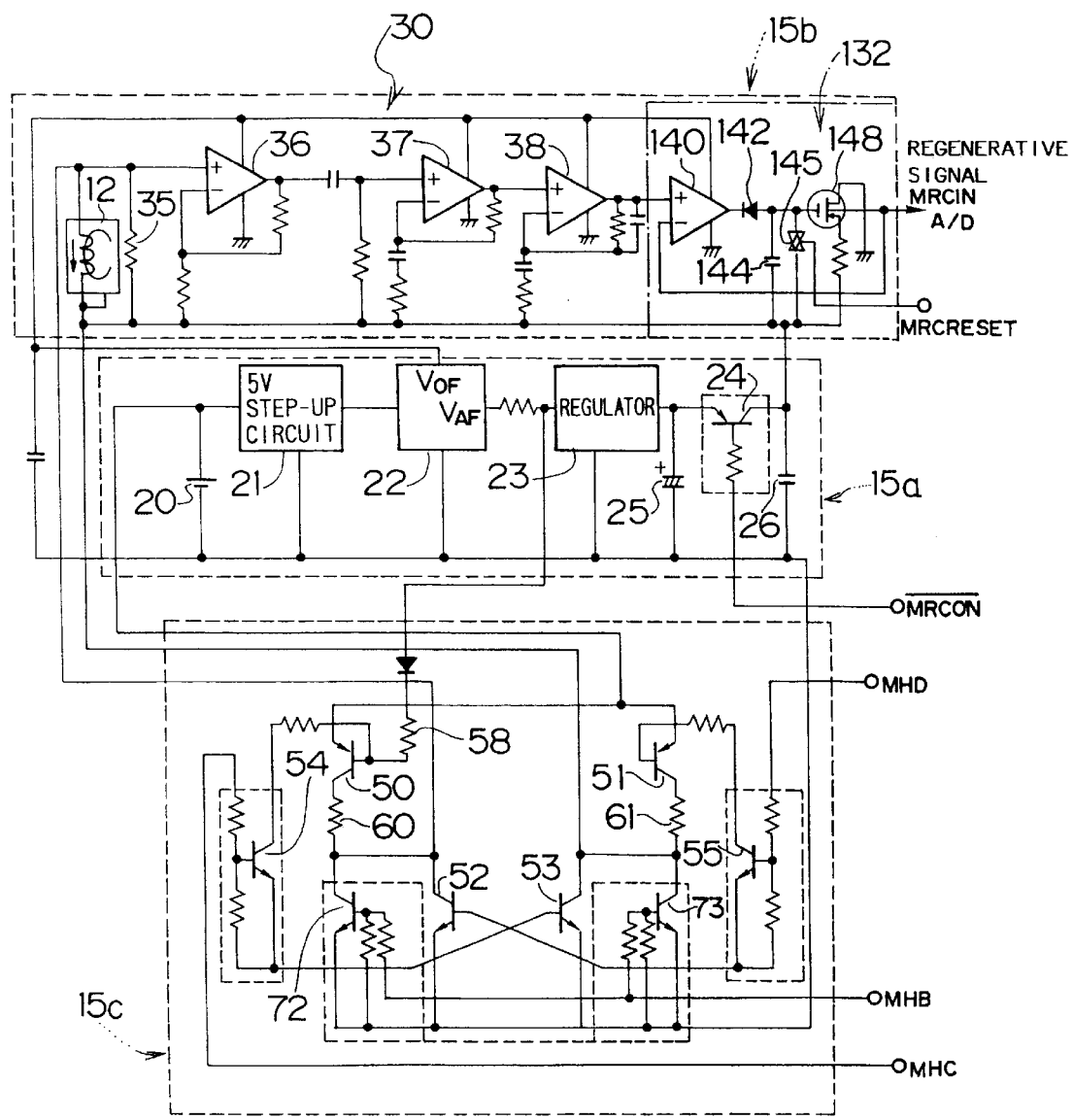

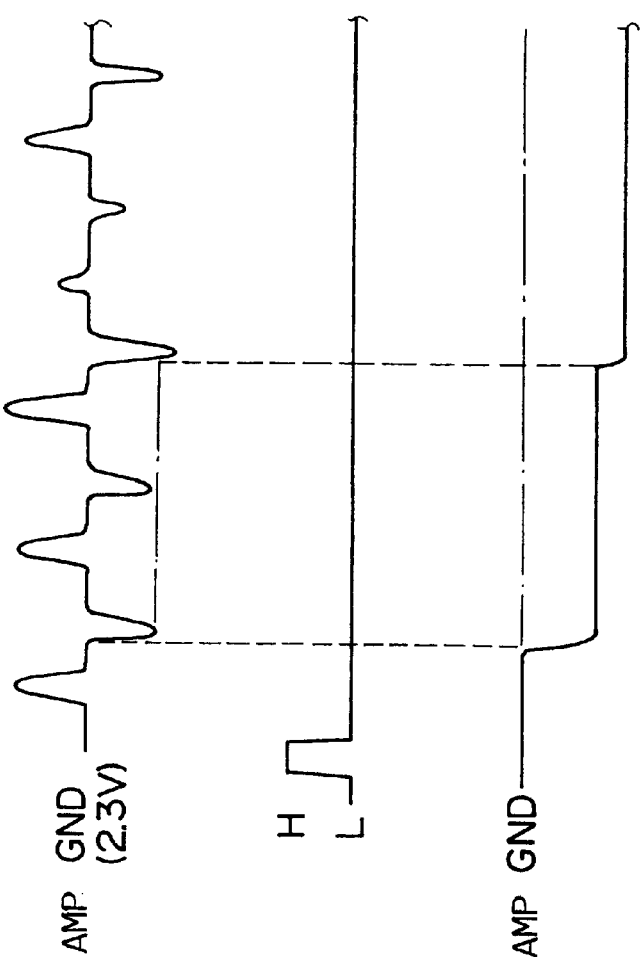
FIG. 28(a) AMPLIFIER OUTPUT
FIG. 28(b) MRCRESET
FIG. 28(c) MRCIN

F I G. 3 1 (a) AMPLIFIER OUTPUT

F I G. 3 1 (b) MRCRESET

F I G. 3 1 (c) PEAK(+)

F I G. 3 1 (d) PEAK(-)

F I G. 3 1 (e) MRCIN 150 (MAGNETIC HEAD DRIVER)

MAGNETIC RECORDING AND REGENERATING UNIT FOR PHOTOGRAPHIC FILM AND CAMERA

This is a divisional of application Ser. No. 08/940,776 filed Sep. 30, 1997, now U.S. Pat. No. 6,026,249, the disclosure of which is incorporated herein by reference.

BACKGROUND OF THE INVENTION

1. Field of the Invention

The present invention relates generally to a magnetic recording and regenerating unit for photographic film and a camera, and more particularly to a magnetic recording and regenerating unit which records magnetic information in a magnetic recording layer on the photographic film and regenerates the magnetic information recorded in the magnetic recording layer, and a camera which the magnetic recording and regenerating unit applies to.

2. Description of Related Art

Advanced photographic film has been proposed in which one side of silver salt film is coated with a magnetic layer (U.S. Pat. No. 5,130,745). A film cartridge which contains the film and a camera which uses the film cartridge for photographing have also been proposed, and they are standardized worldwide.

As shown in FIGS. 32(a) and (b), an advanced cartridge roll film 100 is constructed in such a manner that the film 103 which is wound around a spool 102 is stored in a cartridge case 101, which is substantially cylindrical. A light-shielding lid 104 is provided at one end of the cartridge case 101. The film 103 is completely stored in the cartridge case 101 when the roll film 100 has not loaded in the camera or after the roll film 100 has been taken out from the camera, and the light-shielding lid 104 protects the film 103 from external light.

A data disk 105 is provided at a side end of the cartridge case 101, and the data disk 105 rotates in association with the spool 102. A bar code is printed on the exterior face of the data disk 105, and the bar code indicates the type and sensitivity of the film 103, the number of frames to be exposed, etc.

Apertures which are shaped like a circle, a square, a cross and a semicircle are formed on the other side end of the cartridge case 101. A sectorial white plate (not shown) is provided at the back of these apertures, and the white plate rotates in association with the spool 102. One of the circle, the square, the cross and the semicircle is displayed in white according to a position where the white plate stops. The display of the circle in white indicates that the film in the cartridge case 101 is unexposed; the display of the square in white indicates that the film has already been developed; the display of the cross indicates that the film has already been exposed but undeveloped; and the display of the semicircle in white indicates that the film has some unexposed frames remaining. The display in white is called VEI (visual exposure index), and the index is seen with eyes from the outside to confirm the status of the film used.

The film 103 is constructed in such a way that a surface 103F of the film base is coated with a silver salt photosensitive layer and the reverse side 103R of the film is coated with a magnetic recording layer. Multiple perforations 121 are formed at the edge of the film 103 to specify the range of each frame 120. The photographing information such as the type of a light source for photographing and a focal length, and the information such as the title of the photograph used as a message to a user can be magnetically recorded in magnetic record areas 124, 125 at the upper and lower end of each frame.

When the cartridge film is loaded in the camera, an optical reading mechanism in the camera reads information indicated with the bar code on the data disk 105, and detects the position of the white plate, thereby automatically recognizing the information relating to the film and the used status of the film. In the case of the cartridge film with no exposed film or with some unexposed frame remaining, the light-shielding lid 104 is opened and the spool 102 is rotated in a predetermined direction, so that the film 103 can feed to the first unexposed frame.

After all frames on the film 103 are exposed, a rewind mechanism in the camera takes up the film 103 into the cartridge case 101, and closes the light-shielding lid 104. Further, the white plate, which is fixed on the spool 102, is stopped in a manner to face the cross-shaped aperture, thereby displaying the cross in white to indicate that the film has already been exposed.

If the film is forcibly rewound during photographing with some unexposed frames remaining, the rewind mechanism in the camera takes up the film 103 into the cartridge case 101, and closes the light-shielding lid 104. Further, the white plate, which is fixed on the spool 102, is stopped in a manner to face the semicircular aperture, thereby displaying the semicircle in white to indicate that the film has some unexposed frames remaining.

On the other hand, if the loaded cartridge contains the film on which all frames are exposed or developed, the process is executed to prevent the automatic feeding or the like because photographing is impossible.

According to the above-described camera, the film may be forcibly rewound in a state where there are some unexposed frames remaining on the film, and the film cartridge may be taken out of the camera (hereinafter this film cartridge, which contains the film being partially exposed, is referred to as "a partial cartridge"). When the partial cartridge, which contains the photographic film with one or more of exposed frames and one or more of unexposed frames, is loaded again in the camera, the information in the magnetic recording layer is read via a magnetic head in the camera, and the film feeds to an area with no magnetic information recorded. Thereby, the photographing can be performed from an unexposed frame.

The magnetic recording layer formed on the photographic film has a low magnetic density. Moreover, the base thereof is harder than a conventional magnetic tape, and thus a head touch easily becomes unstable. Hence, a special magnetic head only for reading is provided in which the number of turns of the coil is increased so as to exactly read the information.

In a magnetic head (a regenerating head) in a conventional magnetic regenerating unit for a camera, which regenerates the magnetic information from the magnetic recording layer on the photographic film, the number of turns of the coil wound around the core is approximately 1500. That is because S/N is lowered if the number of turns is small, and thus the magnetic information is difficult to read.

On the other hand, a magnetic head (a recording head) which records the magnetic information in the magnetic recording layer on the photographic film cannot be driven if the number of turns is large. For this reason, the number of turns of the coil is usually between 80 and 100. Thus, a regenerating head and a recording head are provided independently of one another, or a recording coil and a regenerating coil are wound around a core.

FIG. 33 illustrates an example of a conventional magnetic head driver. The magnetic head driver 150 is driven by electricity supplied from a power source $V_B$, and a lithium battery, which is used as a power source for the camera as a whole, is used as the power source $V_B$. A magnetic head 152 is driven by bridge-connected switching transistors 154, 155, 156, 157, and ON/OFF of which are controlled by control transistors 160, 161. The control transistors 160, 161 are turned on and off, respectively, by switching signals (a clock pulse and a data pulse) which oppositely switch the first port P1 and the second port P2 onto a high (H) level and a low (L) level.

After the start of the magnetic recording, if the port P1 becomes the L level and the port P2 becomes the H level according to the clock pulse and the data pulse from a microcomputer, the control transistor 160 is turned off and the control transistor 161 is turned on. Thereby, the switching transistors 154, 156 are turned off, and the switching transistors 155, 157 are turned on. Thus, the recording current $I_H$ flows from the right to the left in the drawing through a coil 152a, which composes the magnetic head 152. Thereby, the magnetic head 152 generates a magnetic field in which the magnetic flux turns in the film feed direction, and a magnetized area ("N magnetized area") in which the magnetic flux turns in the film feed direction is recorded in the magnetic recording layer. On the other hand, when the port P1 becomes the H level and the port P2 becomes the L level, the control transistor 160 is turned on and the control transistor 161 is turned off. Thereby, the switching transistors 154, 156 are turned on, and the switching transistors 155, 157 are turned off. The recording current flows through the coil 152a in the reverse direction, and the magnetic head 152 generates a magnetic field such that the magnetic flux turns in a direction opposite to the film feed direction, and a magnetized area ("S magnetized area") in which the magnetic flux is turns in the direction opposite to the film feed direction is recorded in the magnetic recording layer.

The above-described conventional magnetic recording and regenerating unit, however, employs a sensitive and precise regenerating magnetic head in order to read the information recorded in the magnetic recording layer, and this magnetic head is large and expensive. Moreover, since the regenerating magnetic head is provided independently of the recording magnetic head, or the recording and regenerating head uses two coils wound on a core for recording and regenerating, the magnetic head(s) is large and a driver circuit, etc. connected to the magnetic head has the complicated structure. For this reason, the cost is increased, and the camera cannot be compact and lightweight. Since the number of turns of the coil is large, the magnetic head (the regenerating head) in the conventional magnetic regenerating unit for the camera is large and expensive. Due to the difference in the number of turns of the coil in the recording head and the regenerating head, it is impossible to combine them as one magnetic head.

Furthermore, the above-mentioned magnetic head reads the magnetic information while the film is feeding, and thus the noise of the film feed motor easily overlaps with the information. In particular, since the recently-developed cameras are required to be compact, and the motor is arranged close to the magnetic head, the errors easily take place in the process of reading the magnetic information.

If the conventional magnetic head driver is used as shown in FIG. 33, and when all the switching transistors 154, 155, 156, 157 are turned off on completion of recording the last "S magnetized area", a closed circuit including the magnetic head 152 becomes unstable, and an oscillating current flows through the coil 152a due to the effects of inductance and capacitance within the magnetic head driver. For this reason, there is a problem in that the improper magnetic information is recorded after recording of the last "S magnetized area" because of the oscillating current. To solve this problem, a method has been proposed in which all the transistors 154, 155, 156, 157 are turned on to short-circuit the coil 152a after recording of the last magnetic data (Japanese Patent Application No. 7-128234). This method is effective in a magnetic head driver only for recording, which can have high resistance 164, 165, but is not suitable for a magnetic head driver which is used for both recording and regenerating and has to have small resistance 164, 165 because of the small number of turns of the coil 152a.

On the other hand, there are well known a four-terminal magnetic head in which the recording coil and the regenerating coil are wound on a core, a three-terminal magnetic head in which the regenerating coil includes the recording coil, and the like. In the magnetic head which is constructed in this manner, the number of turns of the regenerating coil is usually the dozens of times as many as the recording coil. When the recording current flows through the recording coil with the drive power of approximately 3 V, a induced current flows through the regenerating coil and a high induced voltage of several dozens V is generated between the ends of the regenerating coil. If the high voltage is directly applied to the amplification circuit for regeneration, elements composing the amplification circuit such as an operational amplifier are broken.

If a protection circuit is provided at the input stage of the amplification circuit for regeneration, or a switch, etc. for electrically cutting off the regenerating amplification circuit from the magnetic head is provided in order to eliminate the above-described disadvantages, the great noise overlaps with the regenerated signal, and the cost is increased.

Furthermore, if the partial cartridge is loaded in the camera, whether a frame is exposed or unexposed must be determined, and the photographic film must be fed to the first unexposed frame, thus requiring much electricity to prepare for photographing. In particular, if whether a frame is exposed or unexposed is determined according to the magnetic information recorded in the magnetic recording layer on the photographic film, the photographic film must be fed at a proper speed. If, for example, the film feed speed changes due to the exhaustion of the battery in the camera, whether a frame is exposed or unexposed cannot be determined, and thus it is impossible to prepare for photographing of the partial cartridge.

SUMMARY OF THE INVENTION

It is an object of the present invention to provide a low-noise and low-priced magnetic recording and regenerating unit for photographic film which uses a single magnetic head for both recording and regenerating consisting of a single coil wound around a single core, and which is able to use a recording circuit and a regenerating circuit in the stable condition without effects of mutual noise, and which is able to prevent the breaking of an operational amplifier of the amplification circuit during recording, and a camera which is provided with the magnetic recording and regenerating unit.

It is another object of the present invention to provide a compact camera which is able to effectively eliminate the noise of a motor and correctly determine whether any magnetic information is recorded or not and feed the film to the position of an unexposed frame.

It is yet another object of the present invention to provide a magnetic recording and regenerating unit for photographic film which decreases the number of turns of a coil in a regenerating magnetic head so as to make the magnetic head smaller and less expensive and read all the necessary information, and which may be used as a magnetic head for recording, and a camera which is provided with the magnetic recording and regenerating unit.

To achieve the above-mentioned objects, a camera of the present invention which loads therein a film cartridge containing photographic film coated with a magnetic recording layer, has film feed means for feeding the photographic film from the loaded film cartridge with a motor, determines whether the loaded film cartridge is a partial cartridge, containing a photographic film having an exposed frame and an unexposed frame, or not, and feeds the photographic film from the loaded film cartridge up to a first unexposed frame if determining that the loaded film cartridge is the partial cartridge; the camera comprises: a magnetic recording means for recording magnetic information in a magnetic record area on the magnetic recording layer corresponding to an exposed frame during one-frame feeding in every photographing; and a magnetic regenerating means being unexposed frame detecting means for detecting the first unexposed frame according to whether magnetic information is recorded in a magnetic record area for each frame on the photographic film, if determining that the loaded film cartridge is the partial cartridge, the magnetic regenerating means comprising a magnetic head for contacting the magnetic recording layer while the photographic film is feeding, the magnetic head including a coil wound on a core; an amplification circuit for amplifying signal voltage generated between terminals of the coil; a smoothing circuit for smoothing signals output from the amplification circuit and outputting the smoothed signals; and a magnetic information detecting means for detecting whether any magnetic information is recorded in the magnetic record area for each frame on the photographic film by determining a voltage level of the signals output from the smoothing circuit and comparing the determined voltage level with a reference level.

According to the present invention, the amplification circuit amplifies the signal voltage generated at ends of the coil in the magnetic head, and then the smoothing circuit smoothes the signal voltage. Then, the voltage level of the smoothed signal is read so as to determine whether any magnetic information is recorded or not. The signal is smoothed without accurately reproducing the information recorded in the magnetic recording layer from the signal obtained via the magnetic head, so that the number of turns of the coil in the magnetic head can be small, and hence the camera can be compact and low-priced. The smoothing circuit eliminates the signals at plus or minus side which are overlapped with AC components of the noise from the motor of the film feed means, and picks out signals only at the other side which are not effected by the noise, thereby correctly reading the voltage level. Moreover, by smoothing the signals from the magnetic head, there is no necessity to raise the sampling frequency which specifies the timing for reading the voltage level.

A low-pass filter is provided next to the smoothing circuit, and eliminates the noise caused by a change in a speed at which the film feed means feeds the film, thereby correctly reading the voltage level.

According to another embodiment of the present invention, the camera of the present invention further comprises a film position recognition means for recognizing a position on the photographic film fed by the film feed means with respect to the magnetic head, and characterized in that the film position recognition means recognizes an area in proximity of the center of each frame on the photographic film where there is a high possibility that some magnetic information is recorded if magnetic information is recorded, and the magnetic information detecting means performs the detection only for the recognized area. Since there is some possibilities that no magnetic information is recorded at front and back ends of the magnetic record area for each frame, the regenerated signals are read from the area in proximity of the center where there is a high possibility that some magnetic information is recorded, so that whether any magnetic information is recorded or not can be determined without fail.

According to yet another embodiment of the present invention, a magnetic recording and regenerating unit for photographic film, which has film feed means for feeding photographic film coated with a magnetic recording layer with a motor and has a magnetic recording function of recording magnetic information in the magnetic recording layer while the photographic film is feeding and a magnetic regenerating function of reading magnetic information recorded in the magnetic recording layer, the magnetic recording and regenerating unit comprises: a magnetic head for accessing to the magnetic recording layer while the photographic film is feeding, the magnetic head including a coil wound around a core; a recording circuit for supplying recording current to the coil during recording, and an amplification circuit for amplifying signal voltage generated at ends of the coil during regenerating and thereby outputting an regenerated signal, the recording circuit and the amplification circuit being connected to the ends of the coil in parallel; a reference voltage apply means for applying reference voltage to the amplification circuit only during regenerating, the reference voltage apply means cutting off the reference voltage from the amplification circuit during a period except for regenerating; a driving power supply means for supplying driving power to the amplification circuit during regenerating and recording; and the magnetic recording and regenerating unit is characterized in that, during recording, the amplification circuit functions as a comparator to protect the amplification circuit from input of signal voltage during recording.

According to the present invention, the single magnetic head in which the single coil is wound around the single core is used for both recording and regenerating, and the recording circuit and the amplification circuit for regeneration are directly connected in parallel to the ends of the coil. During regenerating, the drive power and the reference voltage are supplied to an operational amplifier of the amplification circuit, and the amplification circuit functions as the amplifier for regenerated signals. During recording, only the drive power is supplied to the amplification circuit, and the reference voltage is shut off. Thus, during recording, the amplification circuit functions as the comparator. If the signal voltage, which is applied to the ends of the magnetic head during recording, is input to the amplification circuit, the amplification circuit is not broken. There is no necessity to provide the protection circuit, etc., which can be a source of noise, in the input stage of the amplification circuit. Thus, the noise and cost can be reduced.

According to another embodiment of the present invention, a magnetic regenerating unit for a camera, which feeds photographic film coated with a magnetic recording layer and regenerates magnetic information from the magnetic recording layer on the photographic film; the magnetic regenerating unit for the camera comprises: a magnetic head for accessing to the magnetic recording layer while the photographic film is feeding, the magnetic head including a coil wound around a core, a number of turns of the coil being determined so as to output a regenerated waveform which does not enable reading of the magnetic information but permits determination of whether any magnetic information is recorded or not; and a determination means for determining whether any magnetic information is recorded or not in a magnetic record area for each frame on the photographic film based on voltage signals generated at ends of the coil.

According to another embodiment of the prevent invention, a camera which loads therein a film cartridge containing photographic film coated with a magnetic recording layer, has film feed means for feeding the photographic film from the loaded film cartridge with a motor, determines whether the loaded film cartridge is a partial cartridge, containing a photographic film having an exposed frame and an unexposed frame, or not, and feeds the photographic film from the loaded film cartridge up to a first unexposed frame if determining that the loaded film cartridge is the partial cartridge; the camera comprises: a magnetic recording means for recording magnetic information in a magnetic record area on the magnetic recording layer corresponding to an exposed frame during one-frame feeding in every photographing; and an unexposed frame detecting means for detecting the first unexposed frame according to whether magnetic information is recorded in a magnetic record area for each frame on the photographic film, the unexposed frame detecting means comprising a magnetic head for accessing to the magnetic recording layer while the photographic film is feeding, the magnetic head including a coil wound around a core, a number of turns of the coil being determined so as to output a regenerated waveform which does not enable reading of the magnetic information but permits determination of whether any magnetic information is recorded or not; and a determination means for determining whether any magnetic information is recorded or not in a magnetic record area for each frame on the photographic film based on voltage signals generated at ends of the coil.

That is, the magnetic recording and regenerating unit for the photographic film is used when the partial cartridge is loaded again in the camera. The magnetic recording and regenerating unit reads the magnetic information, which are recorded in the magnetic record area for each frame on the photographic film, in order to detect the frame which has no magnetic information (unexposed frame). Thus, the regenerated signals are not needed for the purpose of perfectly reading the magnetic information. Hence, the number of turns of the coil in the magnetic head can be smaller so that the magnetic head can output the regenerated waveform to determine whether any magnetic information is recorded or not, so in this case the magnetic head can be compact and low-priced. The number of turns of the coil is also determined so that the magnetic head can be used for recording the magnetic information.

BRIEF DESCRIPTION OF THE DRAWINGS

The nature of this invention, as well as other objects and advantages thereof, will be described in the following with reference to the accompanying drawings, in which like reference characters designate the same or similar parts throughout the figures and wherein:

FIG. 5 is a timing chart of a process after the last magnetic data are recorded;

FIG. 6 is a partially enlarged view of the timing chart in FIG. 5;

FIG. 8 is a waveform chart of signals which have passed through an amplification circuit (before smoothing);

FIG. 9 is a partially enlarged view of the waveform chart shown in FIG. 8;

FIG. 12 is a waveform chart of the signals which have just passed the low-pass filter when resistances and condensers within the smoothing circuit and the low-pass filter are changed;

FIG. 13 is a waveform chart of regenerated signals from a magnetic head with a coil of 300 turns;

FIG. 14 is a waveform chart of regenerated signals from a magnetic head with a coil of 1500 turns;

FIG. 27 is a circuit diagram illustrating the second embodiment of the recording and regenerating circuit;

FIGS. 28(*a*), 28(*b*) and 28(*c*) are waveform charts for explaining the operation of the recording and regenerating circuit in FIG. 27;

DETAILED DESCRIPTION OF THE PREFERRED EMBODIMENTS

This invention will be described in further detail by way of example with reference to the accompanying drawings.

Figure 1:
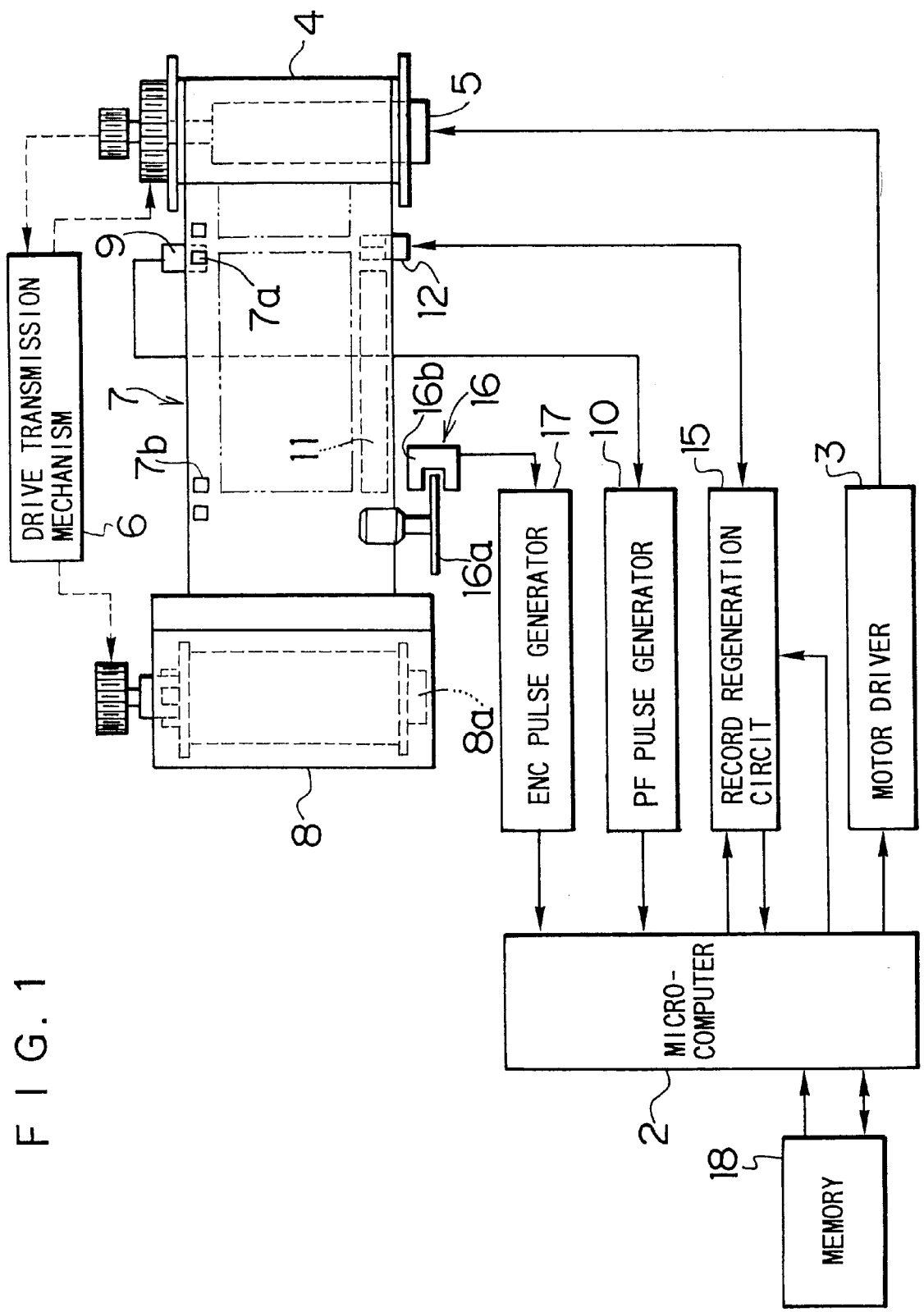
FIG. 1 is a block diagram illustrating the construction of a camera according to an embodiment of the present invention.
Figure 32:
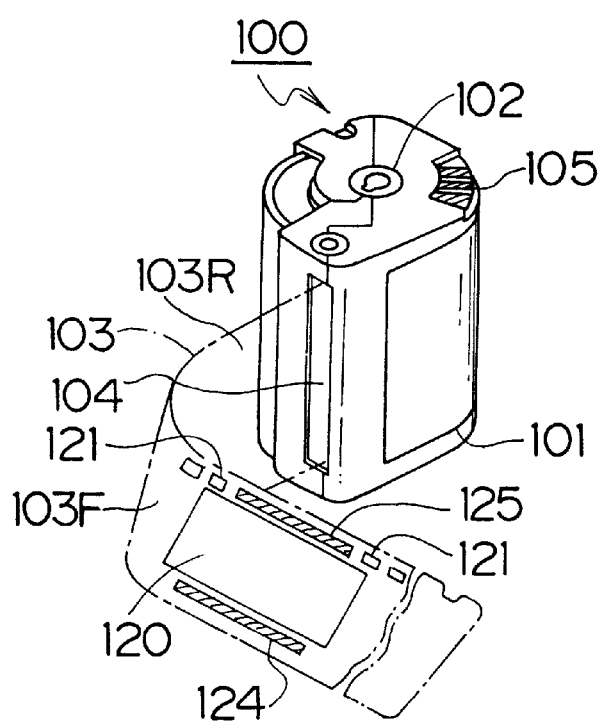
FIGS. 32(a) and 32(b) are views of assistance for explaining the structure of an advanced film cartridge.
Figure 32:
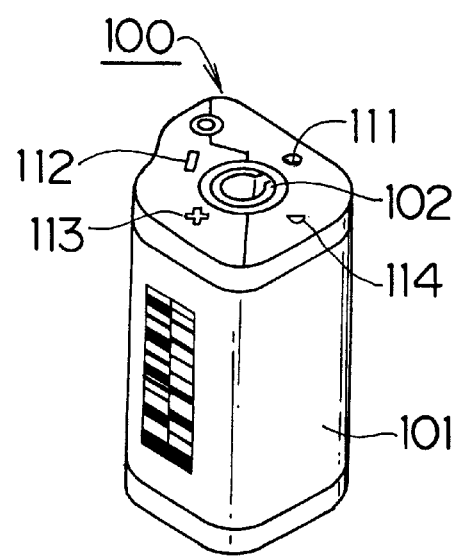
Figure 33:
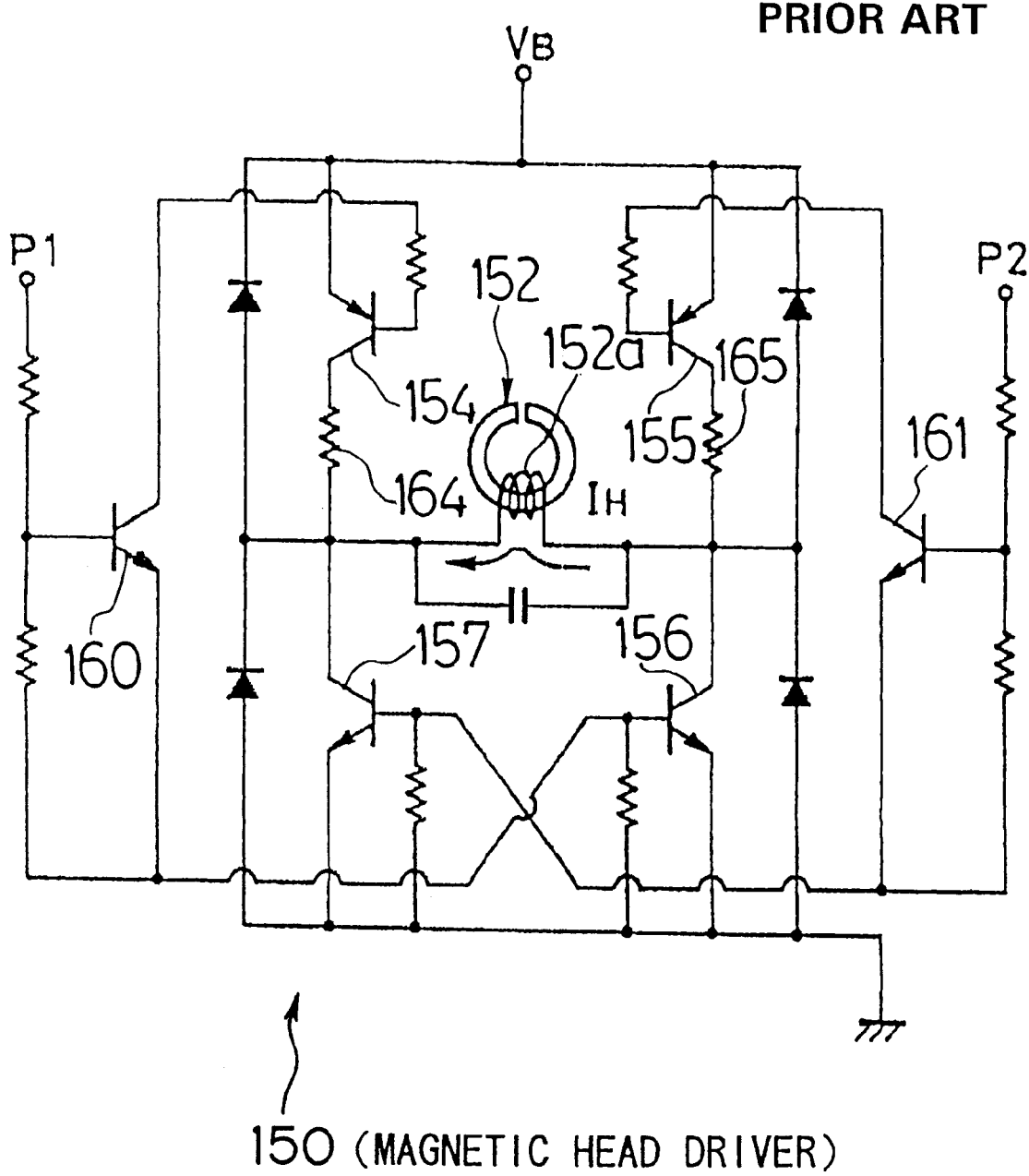
FIG. 33 is a circuit diagram illustrating the construction of a conventional magnetic head driver.

FIG. 1 shows the construction of a camera according to an embodiment of the present invention. This camera uses advanced cartridge roll film shown in FIG. 32. After every photographing, a microcomputer 2 instructs a motor driver 3 to wind the film, and drives a motor 5 built in a spool 4. When the motor 5 rotates, a drive transmission mechanism 6 rotates the spool 4 in a direction to wind the film, and photographic film 7 starts feeding. Thereafter, the photographic film 7 is drawn out of the cartridge 8 to be taken up by the spool 4.

The drive transmission mechanism 6 also rotates a spool 8a of the cartridge 8. Just after the cartridge 8 is loaded in the camera, the drive transmission mechanism 6 drives the spool 8a in a direction to feed the film 7 and sends forth the photographic film from its end. Then, the end of the photographic film 7 is wound on the spool 4. When the photographic film 7 feeds by the rotation of the spool 4 at higher speed than speed at which the film is supplied by the rotation of the spool 8a of the cartridge 8, the spool 8a of the cartridge 8 rotates in association with the feeding of the film.

After the spool 4 has taken up a leader of the film, and the first frame has reached a photographing position, the motor 5 stops its movement. During rewinding, the motor 5 inverts to drive the spool 8a of the cartridge 8 in a direction to rewind the film, and the spool 4 rotates in association with the spool 8a. Then, the photographic film 7 is completely rewound up into the cartridge.

Two perforations 7a, 7b are formed at each frame on the photographic film 7. For the first frame in particular, one more perforation is formed closer to the film leader from the perforation 7a. A reflex photosensor 9 is provided above the film in the edge thereof where the perforations are formed, and a photoelectric signal from the photosensor 9 is input to a PF (perforation) pulse generator 10. The PF pulse generator 10 outputs a pulse signal every time the perforations 7a, 7b pass the front face of the photosensor 9, and the output pulse signal is input to the microcomputer 2.

After receiving a photographing complete signal, the microcomputer 2 drives the motor 5 via the motor driver 3 so as to start feeding the film. When the photosensor 9 detects the perforation 7a at the film leader side, the film stops feeding to complete the feeding of the film by one frame.

A transparent magnetic recording layer is formed on the whole surface at the back of the photographic film 7, and a magnetic head 12 is driven during one-frame feeding of the film. A variety of information relating to the date of photographing and the exposure, for example, are magnetically recorded in a predetermined magnetic record area 11 for each frame. When the information is recorded, characters and numbers which compose the information are converted into binary codes, which are digitally recorded.

A record regeneration circuit 15 generates data pulses of different duty ratios according to record signals supplied by the microcomputer 2 during the recording. A magnetic head 12 magnetically records the data in the form of the binary code "1", "0" based on the data pulses.

During the magnetic recording, an encoder 16 and an ENC (encodement) pulse generator 17 are used so as to prevent a unit bit length from changing due to the film feed speed. The encoder 16 is composed of an encoder plate 16a and a photo-interrupter 16b. The encoder plate 16a is a disc which rotates in association with the feeding of the photographic film 7, and slits are radially formed on the disc at regular intervals. The photo-interrupter 16b photoelectrically detects the passage of the slit. The photo-interrupter 16b outputs a photoelectric signal which fluctuates in synchronism with the feed speed of the photographic film 7. The photoelectric signal is shaped by the ENC pulse generator 17, and the shaped photoelectric-signal is input to the microcomputer 2 as an encodement pulse which is synchronous with the film feed speed. For example, the encoder plate 16a is 8 mm in circumference, and when the encoder plate 16a rotates once, 256 encodement pulses are generated. The encoder plate 16a rotates three times during the one-frame feeding of the film.

During the magnetic recording, the microcomputer 2 transmits the record signals to the record regeneration circuit 15 while clocking the intervals between the encodement pulses. Based on the transmitted record-signals, the record regeneration circuit 15 inverts a magnetic field which is generated by the magnetic head 12 in a timing corresponding to "1", "0" of the binary code in the unit bit length of the magnetic recording.

During the magnetic regeneration, the microcomputer 2 reads the data of the regeneration signals from an A/D port in synchronism with the encode pulses.

The construction of the encoder is not restricted to the above, and the encoder plate may be attached to the spindle of the feed motor 5, and the photo-interrupter may detect the passage of the radially-formed multiple slits on the encoder plate.

A memory 18 in FIG. 1 has a ROM area and a RAM area. The ROM area contains sequence programs for executing the above-stated magnetic recording and for reading the magnetic information on the magnetic record area 11, and data for converting the information to be magnetically recorded into the binary codes.

Figure 17:
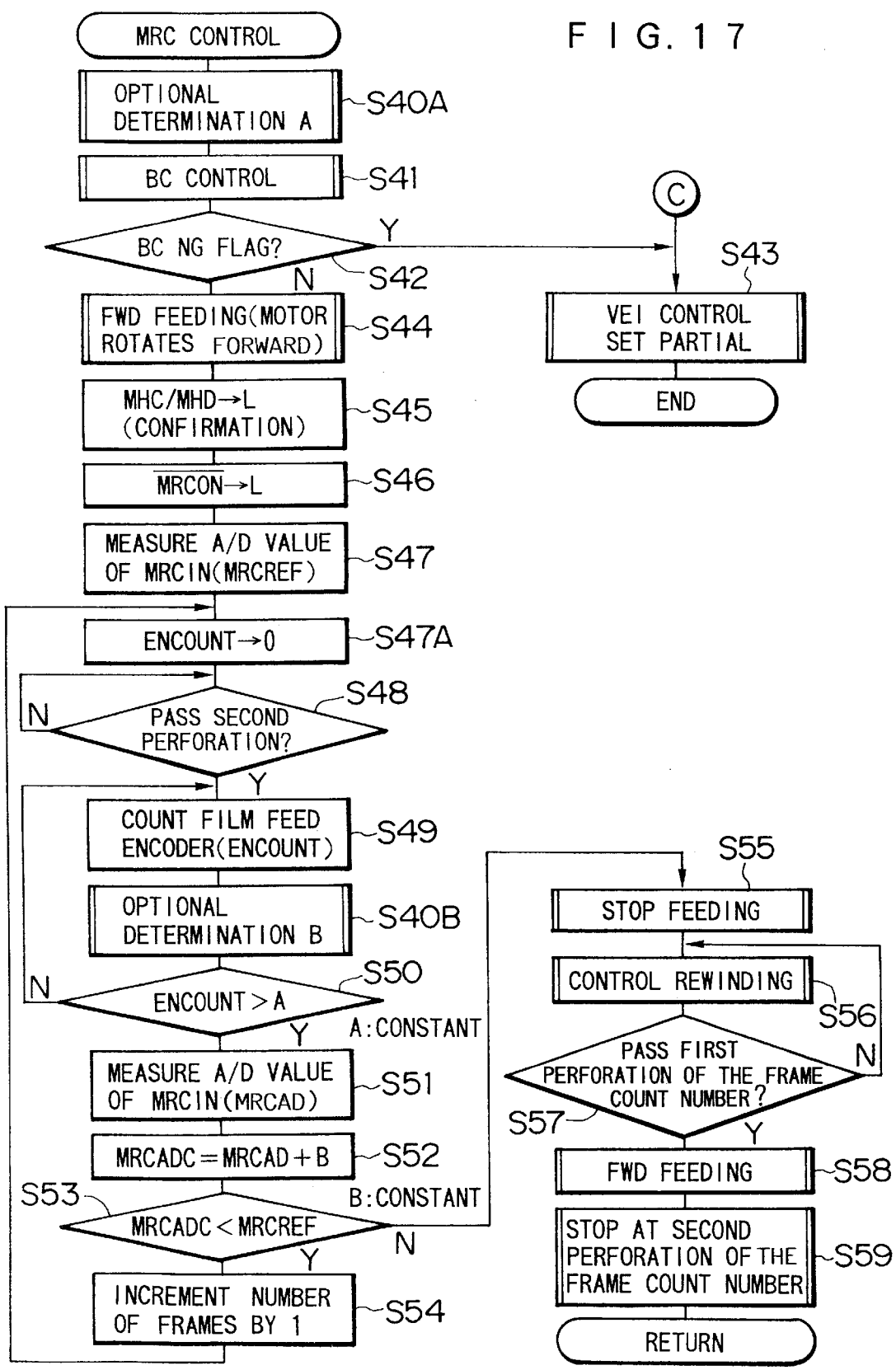
FIG. 17 is a flow chart showing the sub-routine of a mid-roll change (MRC) control.

The RAM area temporarily contains data and flags for recording and regenerating the magnetic data. The magnetic recording method and the regeneration process will later be described in further detail (FIGS. 3 and 17).

Figure 2:
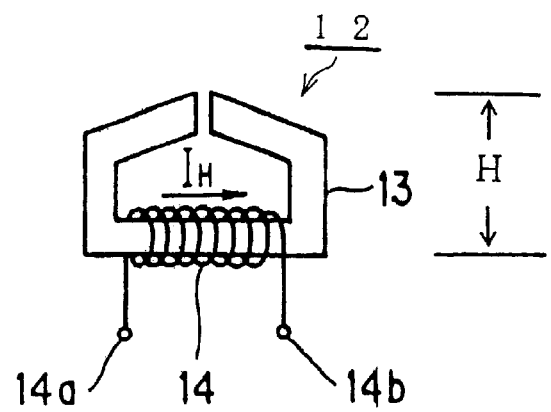
FIG. 2 is a schematic view of a magnetic head.

FIG. 2 shows an example of the construction of the magnetic head 12. The magnetic head 12 consists of a single coil 14 of 300 turns wound on a single core 13, and terminals 14a, 14b of the coil 14 are used for both recording and regenerating. The construction of the magnetic head 12 is not restricted to the above-mentioned one with two terminals in FIG. 2. Two coils for recording and regenerating, respectively, may be wound on a single core, or two heads may be provided for recording and regenerating.

The magnetic head 12 in FIG. 2 consists of the single coil 14 wound on the single core 13, and it can be used both as a recording head and a regenerating head. Thus, the magnetic head 12 has such an advantage that no inductive current is generated on the regeneration side due to the current flowing through the coil during recording. Moreover, since the coil 14 is of only 300 turns, the magnetic head 12 can be compact (thin) and low-priced.

Figure 3:
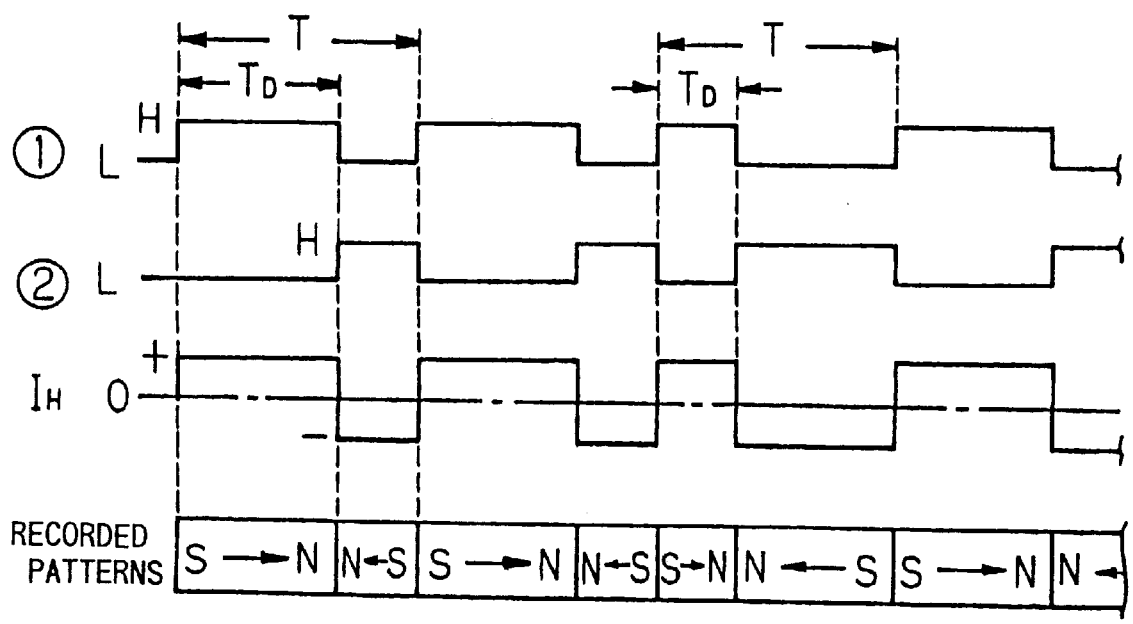
FIG. 3 is a view of assistance for explaining magnetic recorded patterns.

FIG. 3 shows an example of magnetic recorded patterns. ① and ② in FIG. 3 show the timing for switching of potential of the terminals 14a, 14b of the coil 14 in FIG. 2, and $I_H$ shows directions of the recording current flowing through the coil 14.

When the terminal 14a of the coil 14 is on a high level and the terminal 14b is on a low level, the recording current $I_H$ flows in the direction of an arrow in FIG. 2 (a plus direction), and "N magnetized area" (an area in which magnetic flux turns to the right in the recorded patterns illustrated in FIG. 3) is recorded in the magnetic recording layer. When the terminal 14a is on the low level and the terminal 14b is on the high level, the recording current $I_H$ flows in the opposite direction to the arrow in FIG. 2 (a minus direction), and "S magnetized area" (an area in which magnetic flux turns to the left in the recorded patterns illustrated in FIG. 3) is recorded in the magnetic recording layer.

One recording period T for determining the unit bit length of the magnetic recording depends on a period in which the terminal 14a becomes the high level. Pulse duration TD, which determines "1" and "0" of the binary code, depends on whether a termination of the "N magnetized area" is positioned at the first half or the second half of one record period T. The microcomputer 2 outputs the record signal to the record regeneration circuit 15 so that the pulse duration TD can be equal to or greater than T/2 when recording "1" of the binary code, and the pulse duration $T_D$ can be less than T/2 when recording "0" of the binary code.

Figure 4:
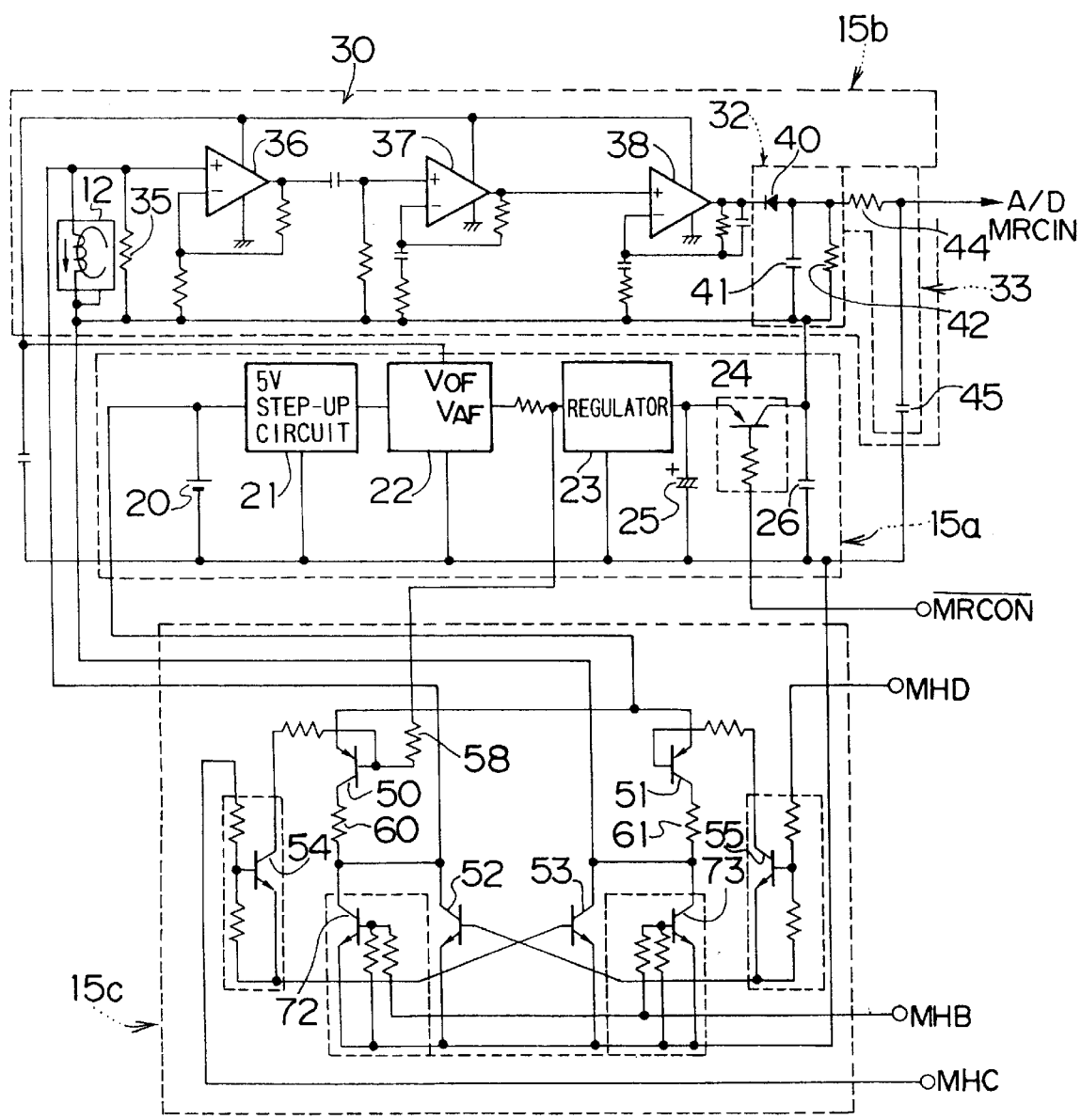
FIG. 4 is a circuit diagram illustrating the first embodiment of a recording and regenerating circuit.

FIG. 4 shows the first embodiment of the record regeneration circuit 15.

The record regeneration circuit 15 is composed mainly of a power source circuit 15a, a regenerating circuit 15b and a recording circuit 15c. The power source circuit 15a includes a battery 20, which is also used as a power source for opening and closing shutter blades and feeding the film during photographing. For example, a lithium battery of 3 V is used as the battery 20. A step-up circuit 21 is able to obtain a voltage of 5 V, a regulator 22 is able to obtain voltages of 5 V and 4.1 V, and a regulator 23 is able to obtain a voltage of 2.3 V.

An output port of the regulator 23 connects to a switching transistor 24, and the base terminal of the transistor 24 connects to a MRCON port of a camera CPU, which is equivalent to the microcomputer 2 in FIG. 1.

When the unexposed frames remaining in the loaded film cartridge 8 are confirmed, the MRCON port outputs a low level (L) signal. When the base terminal of the transistor 24 is grounded, a reference voltage of 2.3 V is applied to an amplification circuit 30 of the regenerating circuit 15b. Two condensers 25, 26 within the power source circuit 15a prevent high frequency noise from overlapping with the reference voltage 2.3 V from the regulator 23.

The regenerating circuit 15b consists of the magnetic head 12, the amplification circuit 30, a smoothing circuit 32 and a low-pass filter 33. The amplification circuit 30 has a resistance 35 for converting the regenerated current flowing through the coil 14 of the magnetic head 12 into regenerated signals, and operational amplifiers 36, 37, 38 which noninverting mplify the signal voltage obtained from the resistance 35. The operational amplifiers 36, 37, 38 may be ones available on the market, and a protective resistance is preferably incorporated into an input stage of each operational amplifier in order to prevent an electrostatic breakdown.

The operational amplifier 38 is provided with a condenser for cutting the high frequency noises In FIG. 4, the signal voltage is amplified in three steps by means of three operational amplifiers, but the construction of the amplification circuit 30 is not restricted to this. The amplification circuit may be an integrated circuit.

The drive power of 5 V is supplied to the power supply lines of the operational amplifiers 36, 37, 38 from the output port ($V_{OF}$ port) of the regulator 22, and the reference voltage of 2.3 V is applied to inversion input terminals of the operational amplifiers 36, 37, 38 from the output port of the regulator 23. The amplification circuit 30 is driven by three types of voltage: the drive power "+$V_{CC}$ (5 V)" from the regulator 22, "-$V_{CC}$ (GND)", and the reference voltage (2.3 V) from the regulator 23. As shown in FIG. 4, using two regulators results in stabilizing the ground of the operational amplifiers.

The regulator 22, which supplies the drive power to the amplification circuit 30, is controlled according to instruction signals from the camera CPU. The drive power is supplied to or cut off from the operational amplifiers 36, 37, 38 according to the instruction signals. Specifically, the drive power is supplied while the instruction is given to feed the film, and the drive power is cut off while the film stops. When the drive power is not supplied, the amplification circuit 30 is inactive. If the signal voltage in writing (recording) is input to the inactive operational amplifiers 36, 37, 38, there is a possibility that the operational amplifiers 36, 37, 38 can be broken. Thus, the drive power is always supplied to the amplification circuit 30 during recording. Since the motor 5 is always driven during magnetic recording, the drive power is supplied to the amplification circuit 30 when the motor 5 is driven.

As stated above, the drive power of 5 V is supplied to the amplification circuit 30 not only when the magnetic information is regenerated (read) but when the magnetic information is recorded (written). Thereby, the operational amplifiers 36, 37, 38 which are not provided with the reference voltage from the regulator 23 can be used as comparators, so that the operational amplifiers 36, 37, 38 can be protected.

According to the above construction, the breakdown of the operational amplifiers can be prevented, and there is no necessity to provide a protective circuit in the input stage of the amplification circuit 30. Moreover, there is no necessity to provide a switch, etc. for electrically cutting off the amplification circuit 30 from the magnetic head 12 during recording. Thus, the noise and cost can be reduced.

The smoothing circuit 32 comprises a diode 40, a condenser 41 and a resistance 42, and it smoothes an electric signal amplified by the amplification circuit 32. In order to recognize a position of an unexposed frame by means of the magnetic information recorded in the magnetic recording layer on the photographic film, it is simply determined whether the magnetic information is recorded or not. There is no need to correctly read the contents of the magnetic information, that is, "1" and "0" of the binary code. For this reason, the signal amplified by the amplification circuit 30 is smoothed to obtain an envelope waveform, and it is determined whether there is any magnetic information recorded or not, according to the obtained envelope waveform.

Figure 7:
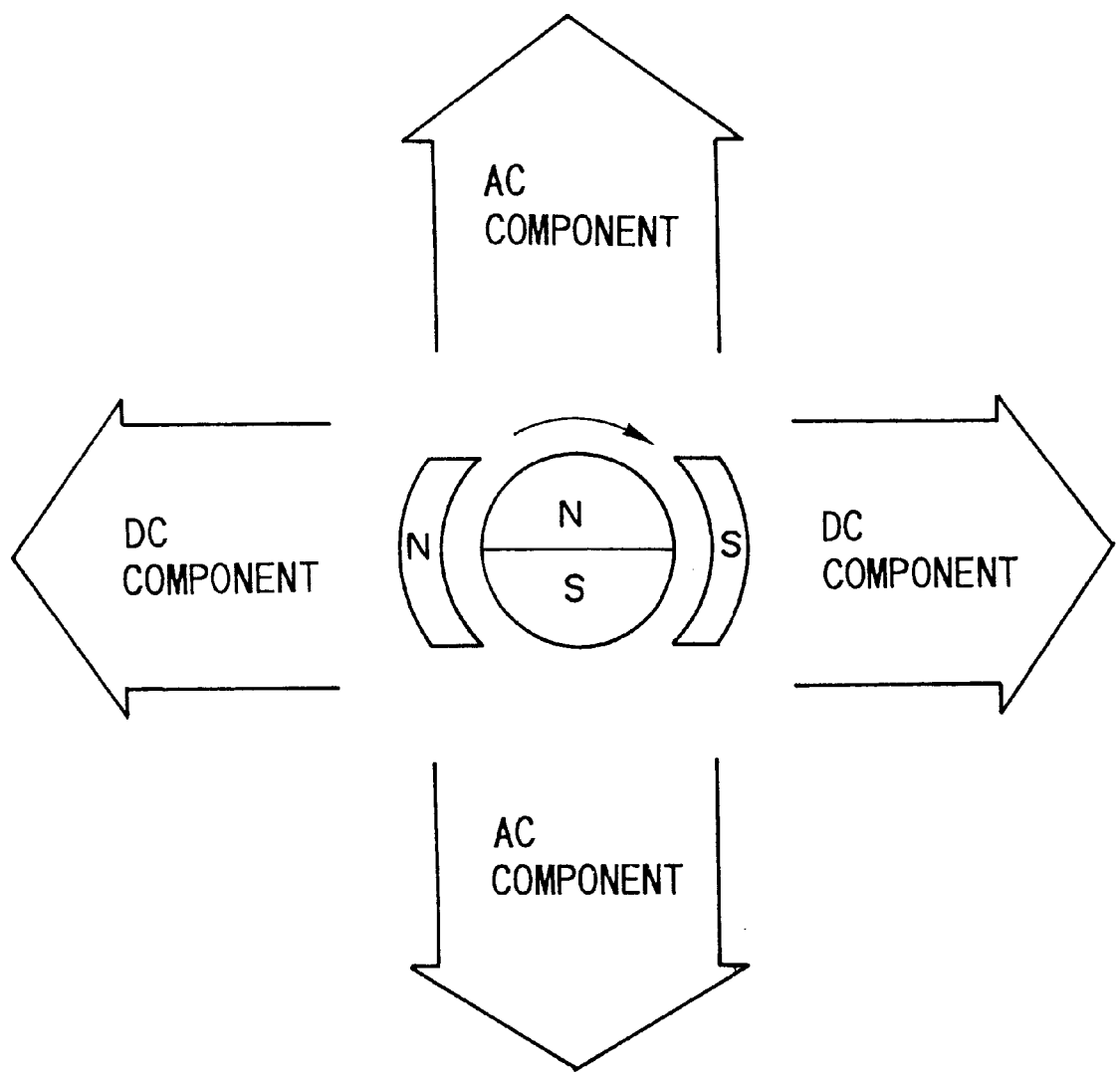
FIG. 7 is a view of assistance for explaining the direction in which the noise of a motor is generated.

In this case, the signal obtained via the magnetic head 12 includes noise components induced by the film feed motor 5. The noise generation of the motor 5 will later be described in detail (FIG. 7). An AC component of the noise from the motor 5 appears at one of plus side and minus side of the signal according to a positional relationship between the motor 5 and the magnetic head 12. In this embodiment, the motor 5 is arranged so that the AC component can appears at the plus side of the signal, and the diode 40 in the smoothing circuit 32 is arranged in a manner to eliminate the AC component from the noise of the motor 5 as shown in FIG. 4. Thereby, the negative side (one side) of the signal is picked up.

The noise overlapping with the signal results from not only the noise of the motor 5 but the unevenness in the film feed speed. The faster the feed speed of the photographic film 7 is, the higher the signal output will be. The slower the feed speed is, the lower the signal output will be. Thus, if the feed load is increased because the film gets old or hard, the change in the feed speed results in the change in the signal output. In order to eliminate the noise resulting from the unevenness of the film feed speed, there is provided the low-pass filter 33 next to the smoothing circuit 32.

The low-pass filter 33 is composed of a resistance 44 and a condenser 45, and combination of the resistance 44 and the condenser 45 can set a cutoff frequency. For example, if the low-pass filter 33 has a low cutoff-frequency of approximately 16 Hz, the effects of the change in the film feed speed can be eliminated.

The regenerated signal passing through the low-pass filter 33 is sent to an A/D port (MRCIN) of the microcomputer 2, which determines whether there is any magnetic data or not according to the sent regenerated signal. A method of determination will be described later.

The reading of the regenerated signal supplied to the AID port (MRCIN) of the microcomputer 2 is synchronous with the encodement pulses from the encoder 16. In this case, after detecting the edge of the perforation 7a, the regenerated signals are disregarded during the number of the encodement pulses from the encoder 16 is counted for a predetermined number, for example 256 pulses. After disregarding the data of 256 pulses, the magnetic information is read from the A/D port.

Because the magnetic information is very likely to be recorded in an area close to the center between the perforations 7a, 7b in the magnetic record area 11 of each photo frame, the magnetic information is read (measured) 256 times after a predetermined amount (256) of pulses are read from the end of the magnetic record area 11. Then, the signal level is determined based on an average or integration of the data which are read 256 times. Thus, by limiting area for reading of the magnetic information for detecting whether there is any magnetic information to the center area, the existence of any magnetic information can be detected without fail.

Before reading the magnetic information of photo frames, the reference data are obtained based on an average or integration of data which are read 256 times. If the encoder 16 is attached to the spindle of the feed motor 5, the reference data can be obtained just after the motor 5 is driven, before the photographic film 7 contacts the magnetic head 12.

Description will hereunder be given of the recording circuit 15c of the record regeneration circuit 15.

The magnetic head 12 connects to the recording circuit 15c in parallel with the amplification circuit 15b. While the photographic film 7 is feeding, the recording circuit 15c is able to write the magnetic information in the magnetic recording layer on the photographic film 7.

The recording circuit 15c magnetically records the information by controlling the direction of the recording current flowing through the coil 14 of the magnetic head 12. The magnetic head 12 is driven by bridge-connected switching transistors 50 (the first switching transistor), 51 (the second switching transistor), 52 (the third switching transistor), and 53 (the fourth switching transistor). Control transistors 54, 55 control ON/OFF of these switching transistors 50, 51, 52, 53.

The base terminals of the control transistors 54, 55 connect to a MHC port and a MHD port, respectively, of the microcomputer 2. During magnetic recording, the high and low signals are supplied to the MHC port and the MHD port oppositely, so that the control transistors 54, 55 are turned on and off.

The base terminal of the switching transistor 50 of the recording circuit 15c connects to the output port ($V_{AF}$ port) of the regulator 22 via a resistance 58. Thereby, the action of the switching transistor 50 can be stabilized by providing a pull-up circuit.

If there is no pull-up circuit, the base and the collector of the switching transistor 50 are free, and the action of the switching transistor 50 is unstable. The MHC port and the MHD port are low level during regeneration. The battery 20 applies the power of 3 V to the emitter of the switching transistor 50. When the slight current flows between the emitter and the collector of the switching transistor 50 due to the noise, etc., a current flows from the battery 20. The current is amplified by the amplification circuit 30, and it overlaps with the regenerated signals of the current generated by the magnetic head 12. For example, during regeneration, if the current generated at the recording circuit 15c is so small as of few nA, the current is amplified to the signal level by the operation of the amplification circuit 30.

Thus, the current from the recording circuit 15c must be completely cut off during regeneration. For this reason, the base terminal of the switching transistor 50 is provided with the above-mentioned pull-up circuit, and the potential is applied to the base of the switching transistor 50 from the regulator 23 while the film is feeding.

Since the reference voltage of 2.3 V is applied to the collector terminal of the switching transistor 51 at the right in the drawing during regeneration, the action of the switching transistor 51 can always be stable, and thus there is no need to provide the pull-up circuit.

Description will hereunder be given of the operation of the recording circuit 15c during recording. The clock pulses and the data pulses from the microcomputer 2 switch the MHC port and the MHD port to high level and low level oppositely, and the switching transistors 54, 55 are selectively turned on and off. When, for example, the switching transistor 54 is tuned on and the switching transistor 55 is turned off, the control transistors 50, 53 are turned on, and the recording current $I_H$ flows through the coil 14 of the magnetic head 12 in the direction of the arrow in FIG. 2. Then, "N magnetized area" is recorded in the magnetic record area 11 on the photographic film 7. To the contrary, when the switching transistor 54 is turned off and the switching transistor 55 is turned on, the control transistors 51, 52 are turned on, and the recording current $I_H$ flows through the coil 14 in the direction opposite to the direction of the arrow in FIG. 2. Then, "S magnetized area" is recorded in the magnetic record area 11.

The amount of the recording current $I_H$ flowing through the coil 14 depends on the voltage of the battery 20, which is the power source, a resistance 60 (or a resistance 61), and a resistance of the coil 14. The resistance of the coil 14 of the magnetic head 12 in FIG. 4 is about several dozens $\Omega$, which is very small compared to a resistance of several hundreds $\Omega$ of a coil of a magnetic head in the conventional audio equipment.

One of the protective resistances 60, 61 connects to the coil 14 in series according to the direction of the current, thereby preventing the excessive current from flowing through the coil 14 during recording and regenerating. The diameter of wire composing the coil 14 and the number of turns of the coil 14 are determined so that the resistance of the coil 14 can be several dozens $\Omega$, and the number of ampere-turns (AT) can be more than 3, more preferably more than 5 for proper magnetic recording and regenerating.

The recording circuit 15c is provided with a brake circuit, which includes transistors 72 (the fifth switching transistor) and 73 (the sixth switching transistor). The base terminals of the transistors 72, 73 connect to a MHB port of the microcomputer 2. A high level signal of one pulse is supplied to the MHB port after magnetic recording, so that the transistors 72, 73 can be turned on. Thereby, both ends of the coil 14 are short-circuited, and the bridge circuit composed of the transistors 50, 51, 52, 53 simultaneously discharges the electric charge which is accumulated in proximity of the magnetic head 12, thereby preventing the unstable recording current from flowing through the coil 14. In this case, the resistance 60, 61 in the bridge circuit act as the protective resistances, thereby preventing the excessive current from flowing through the bridge circuit.

According to the above-described construction, the stray electric charge around the magnetic head 12 is cleared on completion of magnetic recording, so that the non-magnetized area can be formed without fail after the end recording, and the recording errors resulting from the noise can be eliminated.

FIG. 5 is a timing chart showing a process after recording the last magnetic data, and FIG. 6 is an enlarged view of the essential parts of FIG. 5.

After recording the data of the last bit, an end recording process is executed. In the end recording process, the MHC port becomes the H level and the MHD port becomes the L level for a period of the pulse duration $T_D$ of the data pulse which is input to the MHD port when the data of the last bit are recorded, and thereby "N magnetized area" is recorded. Then, "S magnetized area" is recorded at the rear end of the binary data of the last bit. Thereafter, the MHC port becomes the H level and the MHD port becomes the L level in order to record "N magnetized area" (end recording).

As shown in FIG. 6, the MHB port is turned on (high output) just before (several $\mu$s) the clock pulse of the MHC port switches to low level after the clock pulse of the MHC port becomes high level and a predetermined period of time (more than 80 $\mu$s) has passed. Thereby, the transistors 72, 73 are turned on, and the unnecessary electric charge is discharged from the area in proximity of the magnetic head 12, so that the recording errors resulting from the oscillating current can be prevented.

Thereafter, the output of the MHB port is turned off after a predetermined period of time (more than 80 $\mu$s).

Next, an explanation will be given of the noise generating power of the motor 5.

FIG. 7 shows a relation between the arrangement of magnets in the motor 5 and leakage magnetic flux. The leakage magnetic flux includes AC components and DC components, and the magnetic head 12 is affected mainly by the AC components. As shown in FIG. 7, the AC components are generated by switching NS of a rotor, the direction in which the AC components are increased is shifted by 90° from the direction in which the DC components are increased. In substantially the same direction as the direction in which the AC components are increased, brush noise is generated due to the rapid change of a contact between brushes and a commutator.

If the angle (direction) of the motor 5 in the spool 4 of FIG. 1 is changed around the axis, the noise rapidly changes around an angle where the noise is decreased, and thus the noise is difficult to estimate. On the other hand, the change in the noise is stable around an angle where the AC components including the brush noise are increased. Moreover, the AC components are restricted to the noise at one side of the plus side and the minus side.

For the reasons stated above, the positional relationship between the motor 5 and the magnetic head is determined in a manner to generate the noise at one side (the plus side), and the diode 40 in the smoothing circuit 32 eliminates the noise (AC components) generated at the plus side.

If the positional relationship is determined so that the noise is generated at the minus side, the diode in the smoothing circuit 32 turns to the forward direction, and thereby the signal at the upper side (the plus side) is picked up.

An explanation will hereunder be given of the operation of the record regeneration circuit 15 in FIG. 4 during regeneration with reference to waveform charts.

FIG. 8 shows an example of signals just after passing through the amplification circuit (before smoothing). The horizontal axis is graduated in approximately 50 ms. The area in which the amplitude is large represents the magnetic data recorded in the magnetic recording layer, and the area in which the amplitude is relatively small represents an area where there is no magnetic information (for example, an area between two frames). The noise of the motor 5, etc. effects the area where there is no magnetic data.

FIG. 9 is an enlarged view of the area with magnetic data. The horizontal axis is graduated in approximately 1 ms. As shown in FIG. 9, the magnetic data are composed of the clock pulse whose polarity has been inverted and the data pulse which has a different duty ratio from the clock pulse.

Figure 10:
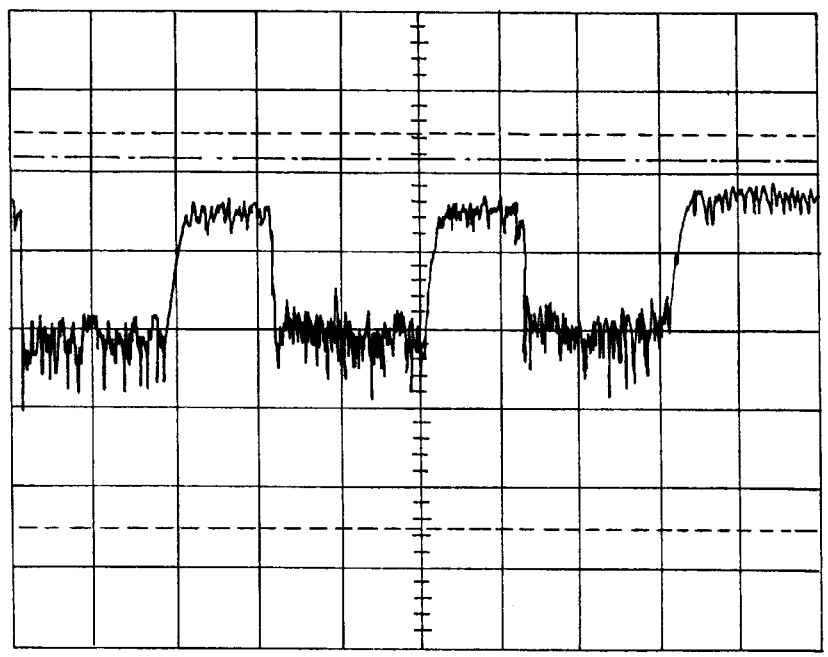
FIG. 10 is a waveform chart of the signals which have just passed through a smoothing circuit.
Figure 11:
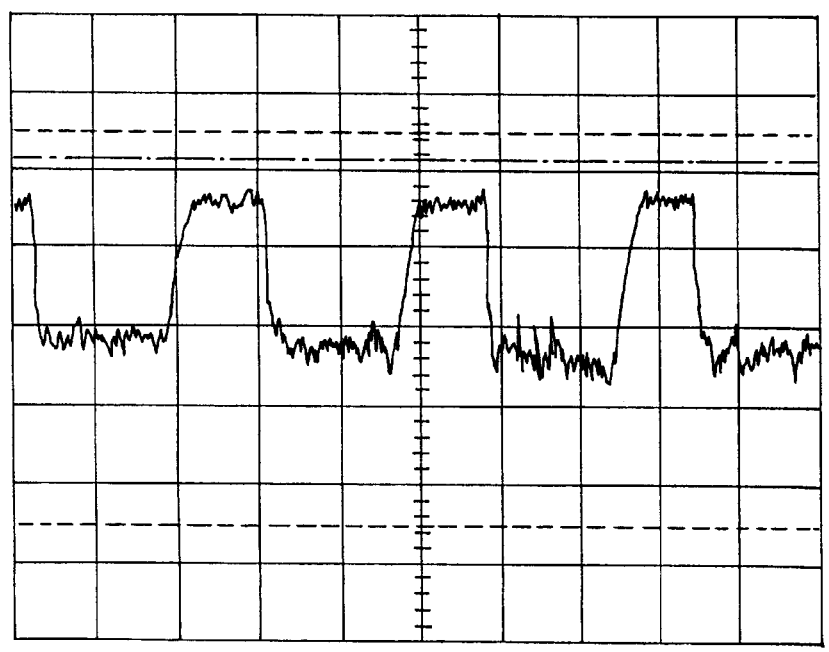
FIG. 11 is a waveform chart of the signals which have just passed through a low-pass filter.

FIG. 10 is a waveform chart describing the case when the smoothing circuit 32 smoothes the signals in FIGS. 8 and 9, which have passed through the amplification circuit 30, and only one side (the negative side) is picked up. FIG. 11 shows the signals of which noise components are eliminated by the low-pass filter 33. In FIGS. 10 and 11, the horizontal axis is graduated in approximately 0.2 ms.

FIG. 12 illustrates another example of the regenerated signals in the case of changing the combination of the resistances 42, 44 and the condensers 41, 45 of the smoothing circuit 32 and the low-pass filter 33. As understood by comparing to FIG. 11, the performance of the smoothing circuit 32 and the low-pass filter 33 depends on the combination of the resistance 42, 44 and the condensers 41, 45. A proper combination is selected to form proper signals to be input to the A/D port in FIG. 4.

This embodiment employs the magnetic head 12 with the coil of 300 turns so that camera can be compact (thin) and low-priced. For example, a conventional regeneration head with a coil of 1500 turns is about 6.5 mm high. The magnetic head with a coil of 300–600 turns is about 2 mm high (H), which is advantageous to make the camera compact. The more the number of turns of the coil is, the larger and more expensive the magnetic head is.

FIG. 13 is a waveform chart of the regenerated signals from the magnetic head 12 with the coil of 300 turns, and FIG. 14 is a waveform chart of the regenerated signal from the magnetic head with the coil of 1500 turns. If the data pulse of "0" or "1" is represented by the pulse which is opposite to the clock pulse recorded at the first half or the second half of one period of the clock pulse, the phase of the data pulse must be correctly read. If the magnetic head with the coil of 300 turns is used as the regenerating head, it is difficult to read the phase because the obtained regenerated waveform loses its shape. If, however, the magnetic information is regenerated in order to detect the first unexposed frame on the partially exposed film contained in the partial cartridge, whether any magnetic information is recorded or not in the magnetic recording layer is determined. There is no necessity to correctly read the contents of the magnetic information, that is, "1" and "0" of the binary code. Hence, the magnetic head with the coil of 300 turns can be used as the regenerating head.

If the number of turns of the coil is further decreased, the level of the regenerated signal is lowered, and the noise is equal to the signal level or more than the signal level, and the existence of the regenerated signal cannot be confirmed. TABLE 1 shows an example of a relation between the number of turns and signal recognition.

TABLE 1

| Number of turns | Signal recognition (present conditions) |
| --- | --- |
| more than 1000 | "0" and "1" can be recognized. |
| 300–1000 | "0" and "1" cannot be recognized, but the existance of the signal can be recognized. |
| less than 300 | The signal may be hard to detect in the noise. If, however, the regeneration is prohibited when the signal is difficult to regenerate, the coil of up to 100 turns can be used. |

Accordingly, this embodiment employs the magnetic head with the coil of 300 turns. If it is impossible to read "0" and "1" but possible to output the regenerated waveform for determining the existence of the magnetic data, the magnetic head is not restricted to 300 turns. Since the magnetic head having the coil of large number of turns is hardly driven when used as the recording head, the number of turns is preferably small. The number of turns is preferably between 100 and 600 in order to use the magnetic head as the recording head by decreasing the number of turns and make the camera compact and low-priced and to output the regenerated waveform for determining the existence of the magnetic signals recorded.

Figure 15:
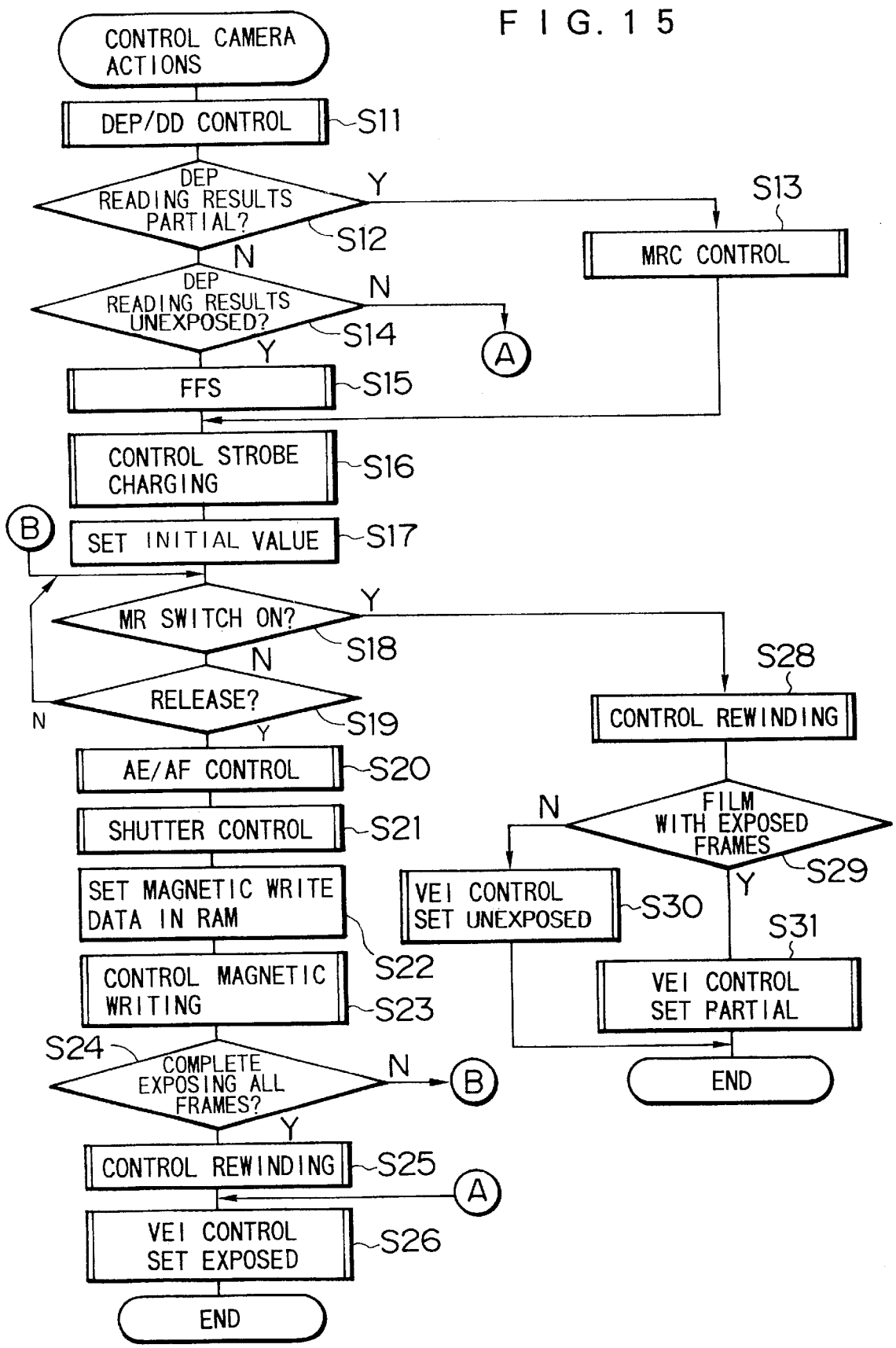
FIG. 15 is a flow chart of processes executed by the camera.

Description will hereunder be given of the operation of the camera which is constructed in the above-mentioned manner with reference to the flow chart of FIG. 15.

When the film cartridge 8 is loaded in the camera, DEP/DD process is executed first (Step Sil, hereinafter only numerals will be denoted). In this process, an optical reader reads a bar code on a data disk provided in the loaded cartridge, thereby obtaining the information such as the film sensitivity, the film type and the number of prints available (DD control). Then, the position of the white plate which is exposed in white for the VEI is detected, and thereby the status of the loaded cartridge 8 is detected (DEP reading). The above-mentioned information is stored in a predetermined area of the memory 18.

Figure 16:
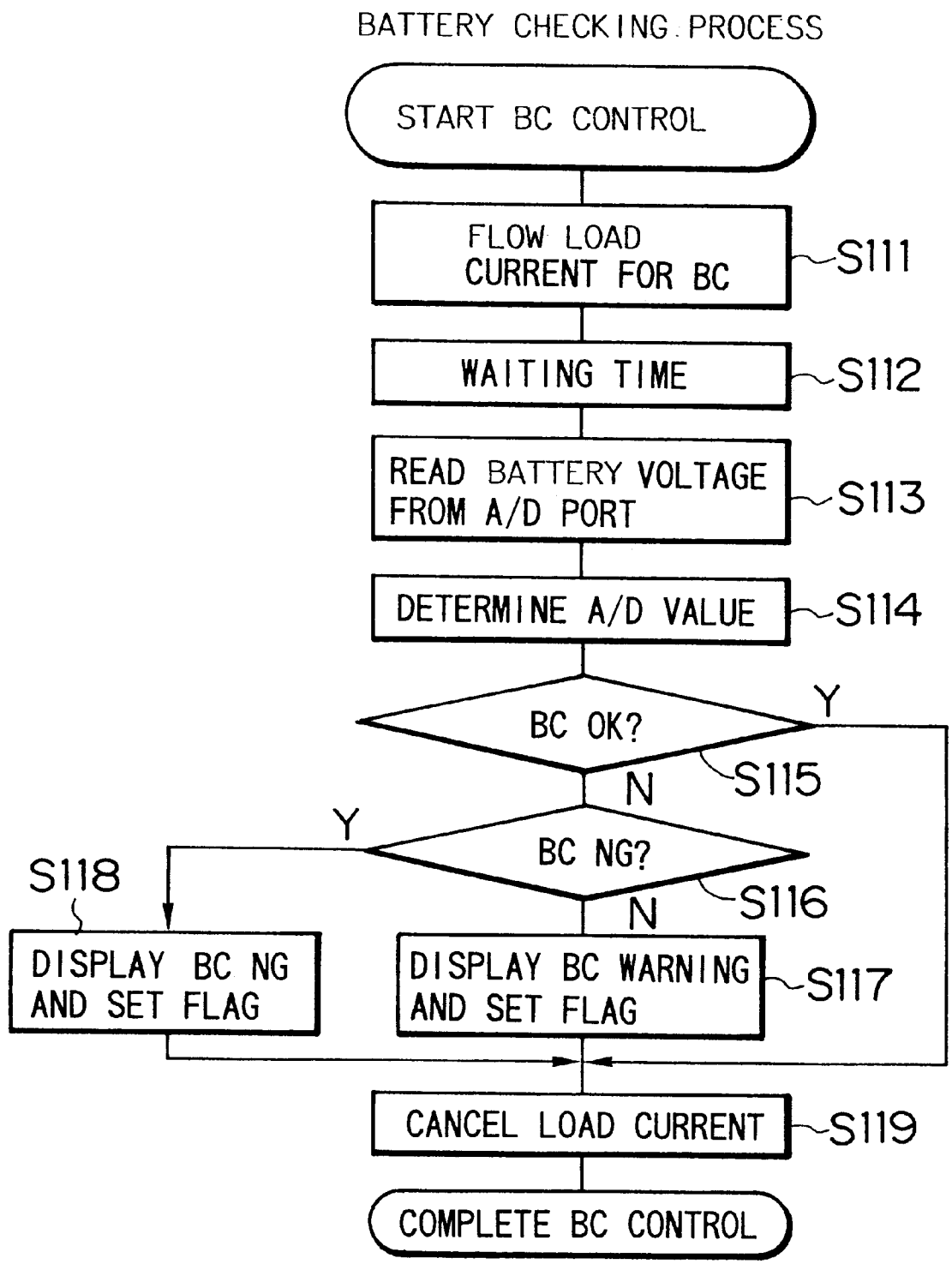
FIG. 16 is a flow chart showing battery checking of the camera.

In S11, the battery is checked as shown in the flow chart of FIG. 16. As shown in FIG. 16, the load current flows for battery checking (BC) (S111). After a waiting time for stabilizing the battery voltage has passed (S112), the voltage level of the battery is read from the A/D port (S113). Then, an A/D value to which the battery voltage is A/D converted is compared to the first and second threshold levels (S114). The first threshold level is for prohibiting the photographing, and the second threshold level is higher than the first threshold level. At the second threshold level, the photographing is possible but the exhaustion of the battery is warned. At a proper voltage level of the battery for executing the photographing, the film can be smoothly fed at least one frame so that the magnetic recording can be performed during one-frame feeding after photographing.

If the A/D value of the battery is higher than the second threshold level, the battery check is approved (BC OK) (S115). After the load current is canceled (S119) to complete the BC control. On the other hand, if the A/D value of the battery is lower then the second threshold level but higher than the first threshold level, a BC warning is display and a BC warning flag is set (S116, S117). If the A/D value of the battery is lower than the first threshold value, a BC NG is display and a BCNG flag is set to prohibit the photographing (S116, S118). When the BCNG flag is set, the camera is prohibited from taking any actions thereafter. The above-mentioned battery checking is performed in each process described later, and it is also performed when the shutter release button is operated and just before the film is rewound.

As shown in FIG. 15, at S12, it is determined whether the loaded film cartridge is the partial cartridge or not, according to the used status detected at S11. In the case of the film cartridge is the partial cartridge, a process called a mid-roll change (MRC) control is executed (S13). A sub-routine of the MRC control will be described later (FIG. 17).

If it is determined that a cartridge other than the partial cartridge is loaded at S12, the process goes on to S14, and it is determined whether the film cartridge has already been used or not. If the film cartridge has already been used, it is determined as being incapable of photographing. Without executing such process as film feeding, etc. the process goes on to (A) in the drawing. That is, in the VEI control, the spool 4 and the sectorial white plate move to a predetermined position to set the exposure of the cross in white so as to indicate that the film has already been exposed, and the loading operation of the cartridge is completed.

On the other hand, if the loaded cartridge has not been used yet, a frame set flag is stored in a predetermined area of the memory 18 to indicate the number of all photo frames $N_{max}$ in accordance with the information obtained during the DD control. The film is fed according to the value $N_{max}$ of the frame set flag. That is, first frame setting (FFS) is executed such that the film feeds to the first photo frame (S15).

After the first frame setting control (S15) or the MRC control (S13), the strobe charging is controlled (S16), and the initial value of the camera is set (S17).

Thus, preparations for photographing are completed. Thereafter, the state of a manual rewind (MR) switch is confirmed (S18). The MR switch rewinds the film into the cartridge in such a state that there are some unexposed frames. Unless the user turns on the MR switch, the MR switch is off.

If the MR switch is off, the state of the release switch is determined. That is, whether the shutter release switch is pressed or not is determined. If the release switch has not been pressed, the process returns to S18. If the release switch has been pressed, the shutter control (S21) is executed after the automatic exposure/automatic focusing (AE/AF) control (S20). The magnetic data such as photographing conditions with respect to the photographed frame are set in the RAM (S22), and then the writing of the magnetic information is controlled during the automatic winding of one frame (S23).

Specifically, the MHC port and the MHD port are H/L controlled and L/H controlled, respectively. "N magnetized area" and "S magnetized area" are formed in the magnetic record area 11 of each frame. In this case, the MRCON port is turned off (H output), and the reference voltage is not supplied to the amplification circuit 30. The VOF port of the regulator 22 is on (5 V output). For this reason, the amplification circuit 30 functions as a comparator, thereby protecting the operational amplifiers 36, 37, 38.

After the last binary data are recorded, the high-level signal is supplied to the MHB port, and both ends of the coil 14a of the magnetic head 12 are short-circuited. Thus, just after the last binary data are recorded, the non-magnetized area can be formed without fail, thereby preventing the recording errors resulting from the noise.

Then, whether all the frames have been exposed or not is confirmed (S24). If not, that is, if there are some frames unexposed, the process returns to S18 as shown in (B) in the drawing. On the other hand, if the photographing (exposing) of all frames is complete, the film is automatically rewound in the rewind control (S25). In this case, the spool 4 and the white plate are moved to a predetermined position in the VEI control, thereby setting the exposure of the cross indicating that the all frames have already been exposed.

When the MR switch is turned on at S18, the rewind process (rewind control) is executed (S28). That is, the motor 5 is inverting driven, and the drawn-out film is rewound into the cartridge, and the light-shielding lid is closed. In this case, whether the film has already been used or not is confirmed (S29). In the case of the unused film, the process is completed after setting the exposure of the circle in white in the VEI control so as to indicate that the film has not been used yet (S30). In the case of the film which has already been used, the process is completed after setting the display of the semi-circle in the VEI control so as to indicate that there are some unexposed frames remaining (S31). Thus, when the film cartridge is taken out of the camera, the status of the film can be easily confirmed.

Description will hereunder be given of the MRC control.

If detecting the loading of the partial cartridge, the process goes on to a sub-routine of the mid roll change (MRC) control shown in FIG. 17.

After the start of the MRC control, it is determined whether the MRC control may be executed or not in an optional determination A (S40A). In this optional determination A, the temperature within the camera is detected first.

Figure 18:
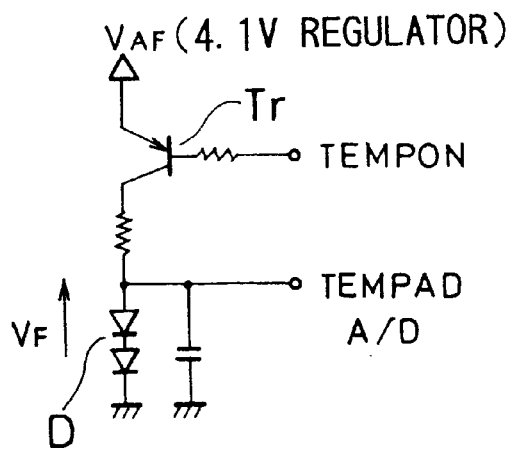
FIG. 18 is a circuit diagram illustrating an example of a temperature measuring circuit.
Figure 19:
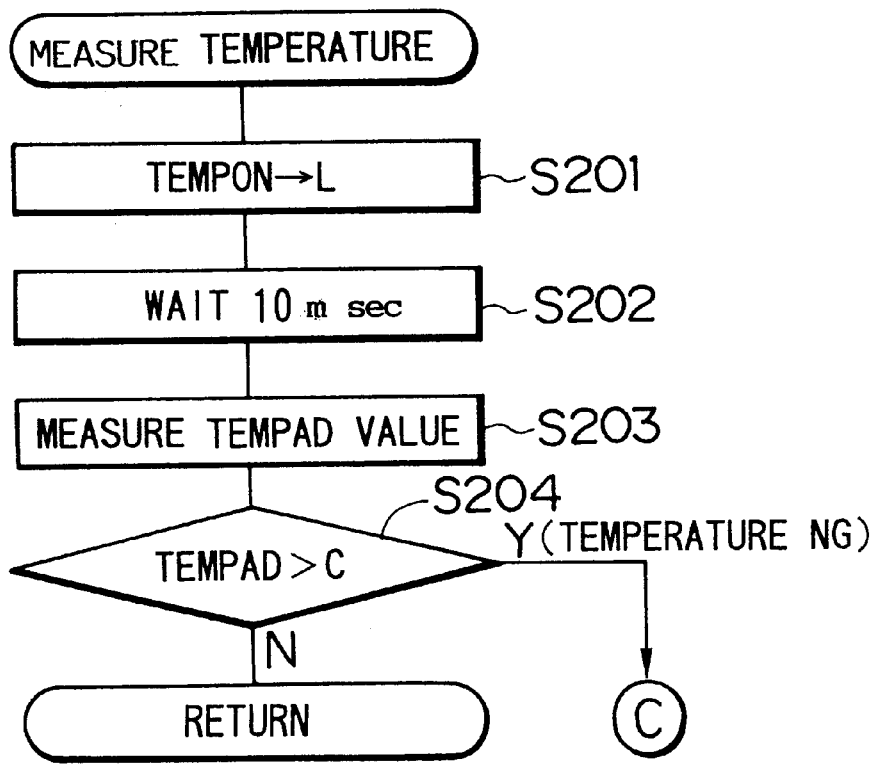
FIG. 19 is a flow chart for determining whether the temperature is suitable or not for the MRC control.

FIG. 18 is a circuit diagram illustrating an example of a temperature measuring circuit. As shown in FIG. 18, the temperature measuring circuit consists of a transistor Tr, which is turned on when the temperature is measured, and a temperature dependent diode D, etc. When a TEMPON signal (a L level signal) is supplied to control ON/OFF of the transistor Tr, the temperature measuring circuit outputs a signal TEMPAD according to the temperature within the camera. Then, an A/D value (TEMPAD value) of the signal TEMPAD is supplied to the camera CPU (not shown). The camera CPU determines whether the temperature is proper for the MRC control in accordance with the flow chart in FIG. 19.

When the temperature is measured, the camera CPU supplies the signal TEMPON of the L level to the transistor Tr, thereby turning on the transistor Tr (S201). After a waiting period (10 ms) has passed to stabilize the measurement of the temperature (S202), the TEMPAD value is read from the A/D port (S203). Then, the TEMPAD value is compared to a constant C which is a TEMPAD value at a predetermined reference temperature (for example, approximately 1.4 V obtained in an experiment at temperature of −10° C.). If the TEMPAD value is more than C, the temperature is determined as NG, and if the TEMPAD value is equal to or less than C, the temperature is determined as OK (S204).

If the temperature is determined as NG, the process is completed after setting the display of the semicircle in white in the VEI control of FIG. 17 (S43) via a flow line (C). If the temperature of the photographic film is lowered, the flexibility of the photographic film is decreased, which results in the irregular feeding. Thus, there is a possibility that the magnetic regeneration cannot be satisfactorily performed during the MRC control.

Figure 20:
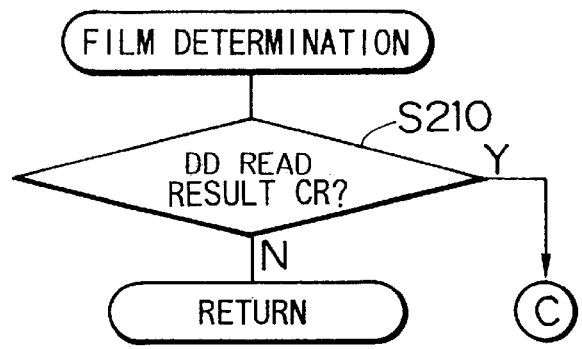
FIG. 20 is a flow chart for determining whether the film is suitable or not for the MRC control.

In the optional determination A, the type of the film cartridge is also determined. As shown in FIG. 20, it is determined whether the film cartridge loaded in the camera contains color negative film (CN) or color reversal film (CR) (S210) according to the information obtained during the DD control. If the film cartridge contains the CR film, the cartridge is determined as NG and the process returns to the flow line C of FIG. 17. Since the magnetic layer of the CR film is thinner than that of the CN film, it is not proper for the MRC control.

When the optional determination A is approved as stated above, a battery checking (BC) control is executed (S41). In the battery checking, the output voltage of the battery 20 is measured while the load current flows, and the measured voltage is compared to a predetermined threshold level. If the output voltage of the battery 20 is less than the threshold level, the state is determined as BCNG. Then, BCNG is displayed, and the BCNG flag is set.

In this embodiment, the threshold level for determining BCNG in the MRC control is the second threshold level (e.g. the threshold level set to warn the exhaustion of the battery) which is higher than the first threshold level for determining BCNG described with reference to FIG. 16. When the partial cartridge is loaded in the camera, the exposed frames and unexposed frames must be distinguished, and the photographic film must be fed to the first unexposed frame, thus requiring much electricity to prepare for photographing. In particular, since the exposed frames and unexposed frames are distinguished according to the magnetic information recorded in the magnetic recording layer on the photographic film, the photographic film needs to be smoothly fed at a predetermined speed.

If the state of the BCNG flag is determined at S42 in FIG. 17 and the BCNG flag is set, the electricity required for processing such as film feeding cannot be obtained. The process is completed after setting the display of the semi-circle in white indicating that there are some frames unexposed in the VEI control (S43).

In this embodiment, the threshold level for determining BCNG in the MRC control is different from the threshold level for determining BCNG described with reference to FIG. 16. The present invention, however, should not restricted to this. Whether the BC warning flag is set or not may be determined at S42 with the threshold level in the battery checking unchanged. That is, if the BC warning flag is set in the MRC control, the camera may be prohibited from taking any actions.

If the BCNG flag is not set at S42, that is, if the residual amount of the battery is more than a predetermined amount, the motor 5 is driven forward to feed the film forward (FWD) (S44). In this case, the $V_{OF}$ terminal of the regulator 22 in FIG. 4 outputs the voltage of 5 V, and the drive power of 5 V is supplied to the amplification circuit 30.

After confirming the MHC port and the MHD port of the microcomputer 2 as being low (L) output (S45), MRCON port is turned into L output (S46). By turning on MRCON, the reference voltage is supplied to the operational amplifiers 36, 37, 38 of the amplification circuit 30, which amplifies the signal generated by the magnetic head 12.

The A/D value which is supplied to the MRCIN port before the photographic film 7 contacts the magnetic head 12 or while the film leader with no magnetic information is feeding, is read as reference data (S47). The reference data are read 256 times in synchronism with the encodement pulses, and a reference value (MRCREF) is obtained according to the average or integration of the data.

As shown in FIG. 1, the perforations 7a, 7b are formed at the front and the rear of each frame on the photographic film 7, and one more perforation is formed closer to the front edge of the film from the perforation 7a. Thus, two perforations are formed at the head of each frame. The perforation of the two perforation which is closer to the front edge of the film is referred to as the first perforation, and the following perforation is referred to as the second perforation. Whether the edge of the second perforation has passed or not is confirmed based on an output of the photosensor 9 (S48). Just after confirming the passage of the second perforation, the counting of the encoder pulses from the encoder 16 is started.

Figure 21:
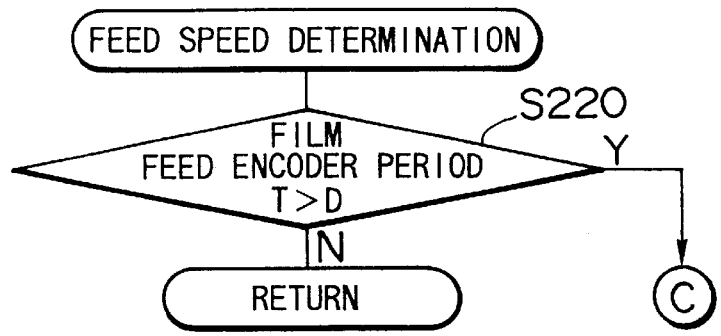
FIG. 21 is a flow chart for determining whether the film feed speed is suitable or not for the MRC control.

At that time, whether the MRC control may be executed or not is determined in an optional determination B (S40B). As shown in FIG. 21, the period of the encoder pulse during the feeding is measured in the optional determination B. If the period T is larger than a reference period D (constant) (i.e. T>D), the film feed speed is determined as being lowered, that is, NG (S220), and the process returns to the flow line C of FIG. 17. If the feed speed of the photographic film is lower than a predetermined reference speed, S/N deteriorates.

Figure 22:
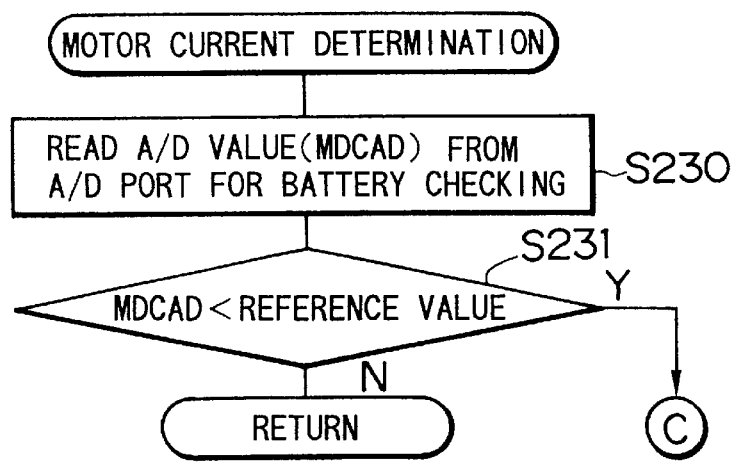
FIG. 22 is a flow chart for determining whether the motor current is suitable or not for the MRC control.

Likewise, in the optional determination B, the A/D value (MDCAD) is read from the A/D port for battery checking (BC) as shown in FIG. 22 (S230). Then, it is determined whether MDCAD is smaller than a predetermined reference value (the A/D value on BC) or not (S231). When MDCAD is smaller than the reference value, the film feed load is larger than the load in BC (battery checking is usually performed with the maximum load applied). In this case, the film feeding is determined as NG, and the process returns to the flow line C of FIG. 17.

In an embodiment described with reference to FIG. 22, the amount of the film feed load is determined based on the voltage of the battery; however, the present invention should not be restricted to this. If the measured current of the motor is larger than a predetermined reference value (e.g. the motor current value which is measured during normal feeding), the film feed load may be determined as being large. The motor current can be found by measuring a voltage drop with a potential difference meter when the measured current flows to a resistor.

If the optional determination B (S40B) is approved, the counted value (ENCOUNT) which is counted at S49 is compared to a predetermined constant A (e.g. 256) (S50). If the counted value (ENCOUNT) is smaller than the constant A (e.g. 256), the process returns to S49. When the counted value reaches 256, the A/D value of the MRCIN port is read (S51). In this embodiment, the data of 256 pulses are disregarded to obtain the data in proximity of the center of the magnetic record area; however, another constant A may be set if the data in proximity of the center of the magnetic record area can be obtained.

The A/C value is read 256 times in synchronism with the encoder pulses at step S51, and regenerated data (MRCAD) are obtained based on the average or integration of the data.

Thereafter, MRCADC is found by adding a predetermined constant B to the regenerated data (MRCAD) (S52), and the difference or ratio between the regenerated data MRCADC including the margin (the constant B) and the reference MRCREF is found (S53). If the regenerated data are smaller than the reference, it indicates that the magnetic information is recorded in the frame, that is, the frame has already been exposed. The film count number is incremented by one frame (S54), and the process returns to S48.

On the other hand, at S53, if the regenerated data are larger than the reference, it indicates that the magnetic information is not recorded in the frame, that is, the frame has not been exposed yet. The film stops feeding (S55). Then, the rewinding is controlled (S56), and the film is rewound until the first perforation of the frame count number passes (S57).

When the first perforation of the frame count number is detected at S57, the motor 5 rotates forward again, and the film feeds forward (S58). When the second perforation of the frame count number is detected, the driving of the motor 5 is stopped (S59). Then, the process returns to the main routine shown in FIG. 15, and the process following the strobe charging (S16) is executed.

As stated above, after exposing the frames to half of the roll of photographic film 7, the camera is able to rewind the exposed photographic film 7 into the cartridge 8 and then take out the photographic film from the cartridge 8. When the partial cartridge is loaded in the camera, the position of the unexposed frame on the film is found by detecting whether there is any magnetic information recorded in the magnetic recording layer of each frame, so that the photographing can be performed again from the unexposed frame.

In this embodiment, if one of four results of the optional determination A or B (shown in FIGS. 19–22) is NG, the MRC control is not performed. The present invention, however, is not restricted to this. Another condition may be set that, for example, the MRC control is performed even if one of the determination results is NG, and the MRC control is not performed if two or more of the determination results are NG. The reset timing, the number of measuring MRCNAD, etc. are not restricted to the above-described embodiment. Instead of using the average value, the integrated value may be compared to a reference value.

In this embodiment, the A/D value which is supplied to the MRCIN port while the film leader is feeding, is read as the reference data (S47). The present invention, however, is not restricted to this. The reference data may be read from another part where there is no magnetic information recorded.

Figure 23:
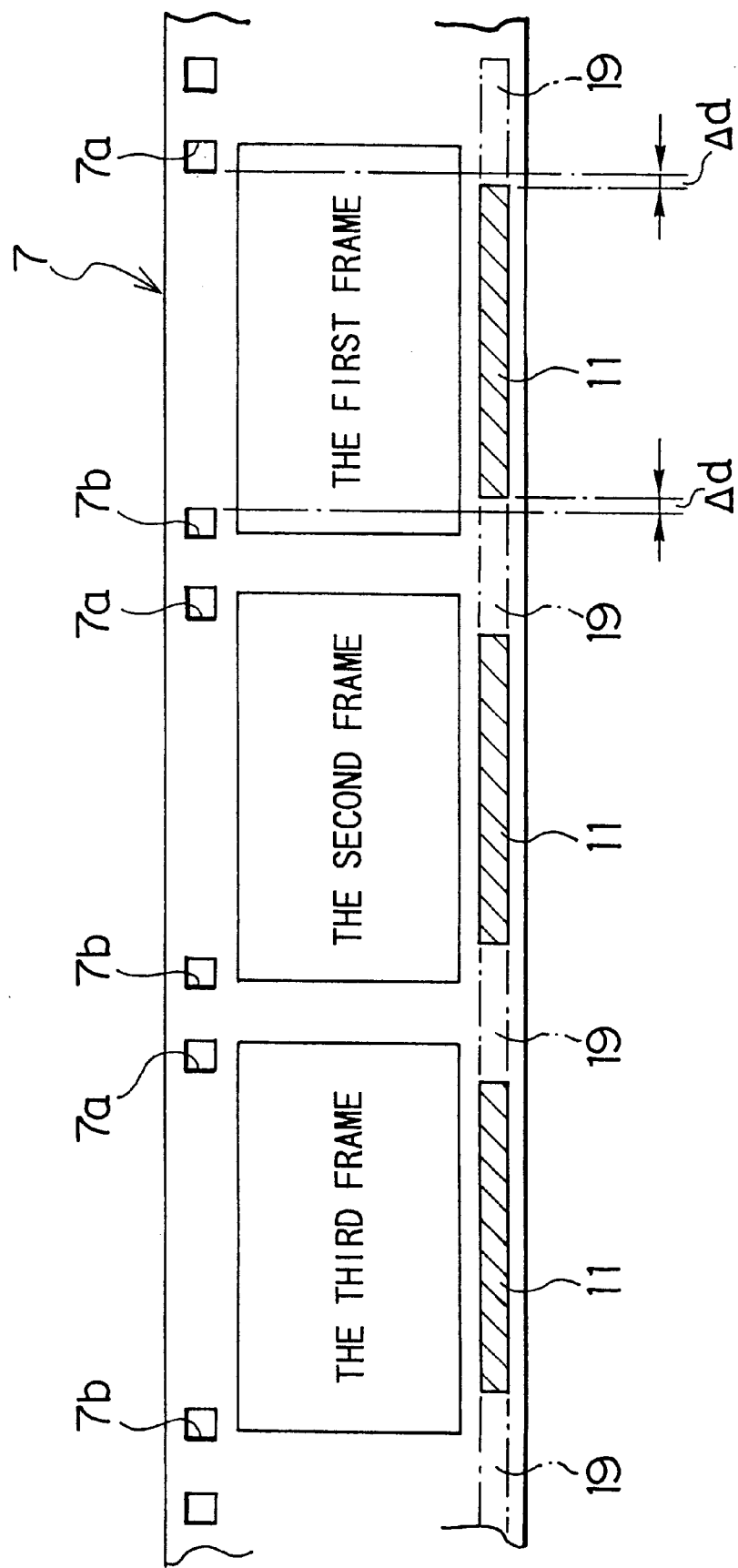
FIG. 23 is an enlarged view illustrating the construction of the photographic film.

That is, as shown in FIG. 23, the magnetic record area 11 for each frame is positioned inward by a predetermined amount Δd from the edge at the inside of each of the perforations 7a, 7b which specifies each end of a frame. The information relating each frame is magnetically recorded only in the corresponding magnetic record area 11. Thus, the magnetic information is not recorded in areas 19, which are indicated by alternate long and short dash lines, in front of the magnetic record area 11 of the first frame and between the magnetic record areas 11.

Accordingly, a signal which is obtained while the magnetic head 12 contacts the area 19 with no magnetic information recorded may be used as reference data.

The reference data can be obtained at any position in the area 19 with no magnetic information recorded. The reference data are preferably obtained when the reading part of the magnetic head 12 is positioned at the first or second perforation, that is, within the width of the first or second perforation.

The perforations 7a, 7b are about 2 mm wide in the direction to feed the film. After the photosensor 9 detects the edge of the perforation 7a or 7b, the reference data are obtained within next 2 mm (e.g. 1 mm).

Figure 24:
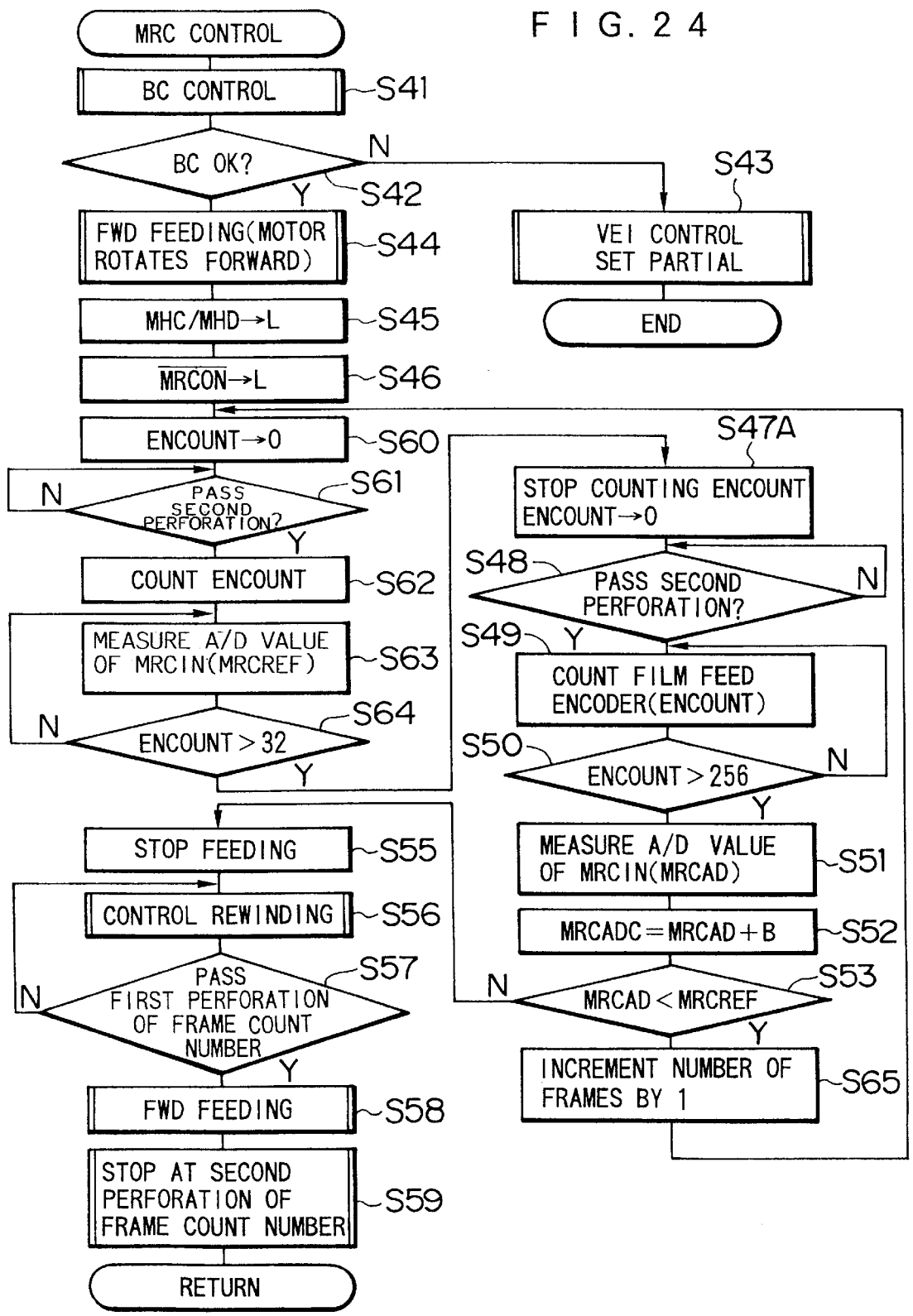
FIG. 24 is a flow chart showing another embodiment of the sub-routine of the mid-roll change (MRC) control.

Description will hereunder be given of a procedure for obtaining the reference data in the above-mentioned area in MRC control with reference to a flow chart of FIG. 24. The steps similar to those in the MRC control in FIG. 17 are denoted by the same reference numerals, and they will not be described in detail.

The MRC control shown in FIG. 24 has additional steps of obtaining the reference data (instead of S47, the steps from S60 to S64 are performed).

That is, in order to obtain the reference data, a counter value (ENCOUNT) of the counter, which counts the encodement pulses of the encoder 16, is initialized at "0" (S60). At S61, whether the front edge of the second perforation has passed or not is confirmed according to the output of the photosensor 9. On confirmation of the arrival of the second perforation, the counting of the encodement pulses of the encoder 16 is started (S62). An A/D value supplied to the MRCIN port is read in synchronism with the encodement pulses as the reference data (S63). Then, whether the ENCOUNT value exceeds 32 or not is determined (S64), and the reference data are read until the ENCOUNT value exceeds 32.

Then, the reference value (MRCREF) is found according to the average or integration of the reference data which are read 32 times. When the frame count number is incremented by one frame at S65, the process returns to S60 to find a new reference value (MRCREF).

In this embodiment, after detecting the second perforation, the data of 32 pulses are read to obtain the reference data within the width of the perforation where the magnetic information is not recorded at all. However, the first perforation may be used instead of the second perforation. Another condition may be set if the reference data can be obtained in the area with no magnetic information recorded.

The perforation is 2 mm wide as has been explained with reference to FIG. 23. 32 pulses of the encodement pulse are generated while the film feeds 1 mm. On completion of reading the reference data of 32 pulses, the reading part of the magnetic head 12 is still within the width of the second perforation.

In this embodiment, after amplification of the signal voltage which is generated at the ends of the coil of the magnetic head, the smoothing circuit smoothes the signal voltage. The signal level after smoothing is read to determine whether there is any magnetic recording. However, as described later, another circuit which has no smoothing circuit may be used for determining whether there is any magnetic recording.

Figure 25:
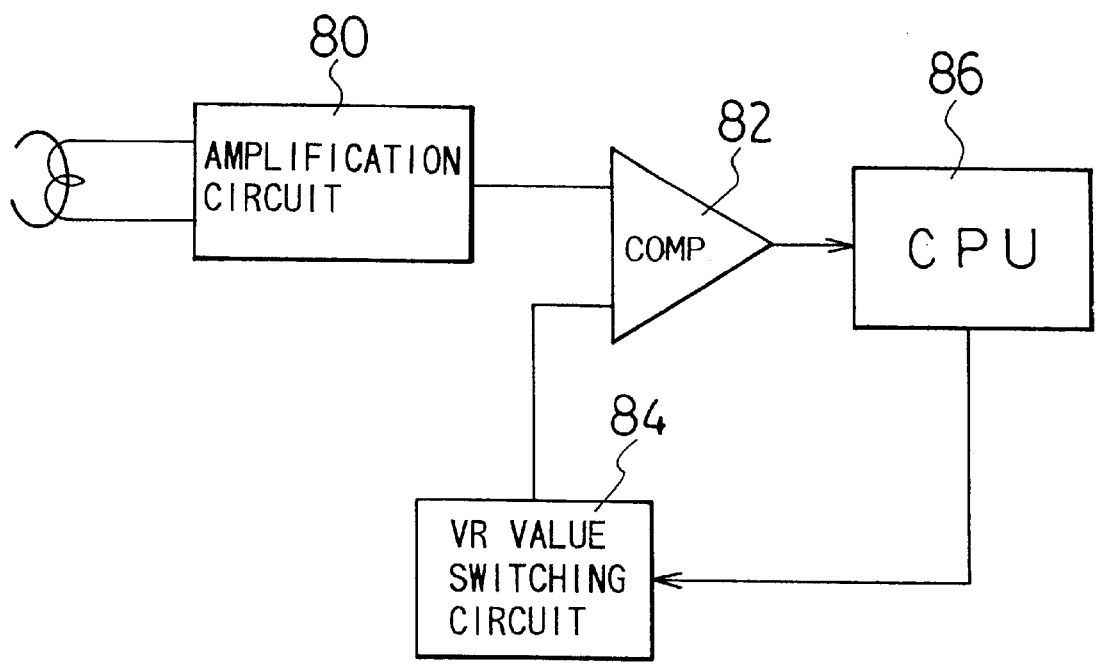
FIG. 25 is a block diagram illustrating another embodiment of a circuit which determines whether there is any magnetic information recorded or not.

FIG. 25 is a block diagram illustrating another embodiment of a circuit which determines whether there is any magnetic information recorded or not. In this embodiment, the signal voltage obtained with the magnetic head 12 is amplified by an amplification circuit 80 and is input to an input terminal of a comparator 82. The signal from the amplification circuit 80 is as the signal which has not been input to the smoothing circuit 32 in FIG. 4.

A VR value is input to the other input terminal of the comparator 82 from a VR value switching circuit 84, and the VR value is a reference for comparison. The camera CPU 86 switches the VR value so as to distinguish between a part of large amplitude as shown in FIG. 8 and a part of small amplitude in proximity of the center of FIG. 8.

Figure 26:
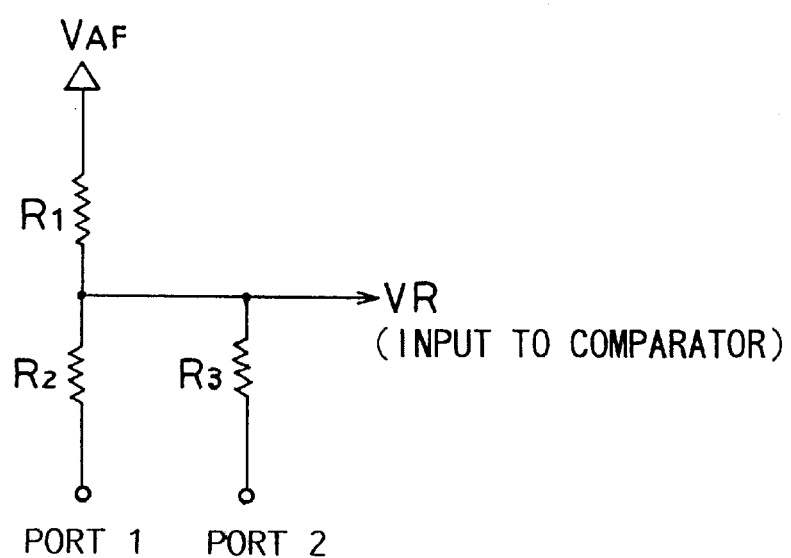
FIG. 26 is a circuit diagram illustrating an example of a VR value switching circuit in FIG. 25.

That is, the VR value switching circuit 84 has two ports 1 and 2 as shown in FIG. 26, and it outputs four VR values $V_1$–$V_4$ shown in the following TABLE 2 according to whether the ports 1 and 2 are ground level (L) or open (OPEN).

TABLE 2

| | Port 1 | Port 2 | VR value |
|---|---|---|---|
| $V_1$ | open | open | $V_{AF}$ |
| $V_2$ | L (GND) | open | $V_{AF}R_2/(R_1 + R_2)$ |
| $V_3$ | open | L (GND) | $V_{AF}R_3/(R_1 + R_3)$ |
| $V_4$ | L (GND) | L (GND) | $V_{AF}R_2R_3/(R_1R_2 + R_1R_3 + R_2R_3)$ |

If the part of large amplitude shown in FIG. 8 is input to the comparator 82, the comparator 82 outputs, to the camera CPU 86, a pulse signal which is synchronous with one of the clock pulse and the data pulse which compose the magnetic information. On receipt of the pulse signal from the comparator 82 (that is, when there is a change in the input signal), the camera CPU 86 determines that the frame has already been exposed. If receiving no pulse signal or an extremely small number of pulses (the input signal is regarded as noise), the camera CPU 86 determines that no magnetic information is recorded in the frame, which has not been exposed yet. The camera CPU 86 switches the VR value, which is output from the VR value switching circuit 84, to an optimum value so as not to change the signal output from the comparator 82 while the magnetic information is not regenerated (only noise is input).

FIG. 27 illustrates the second embodiment of the record regeneration circuit 15 in FIG. 1. The parts similar to those in the first embodiment described with reference to FIG. 4 are denoted by the same reference numerals, and they will not be described in detail.

The second embodiment is characterized by a peak hold circuit 132, which is provided instead of the smoothing circuit 32 and the low-pass filter 33 in FIG. 4.

The peak hold circuit 132 comprises an operational amplifier 140, a diode 142, a condenser 144, an analog switch 145 and a MOS FET 148 as a buffer. The output of the peak hold circuit 132 is input to the A/D port (MRCIN) of the camera CPU.

The analog switch 145 is ON/OFF controlled according to the signal (H/L) input from the output port (MRCRESET) of the CPU. By turning on the analog switch for resetting, the condenser 144 is discharged.

In order to recognize the position of the unexposed frame by means of the magnetic information recorded in the magnetic recording layer on the photographic film 7, whether the magnetic information is recorded or not in the magnetic recording layer is determined. The contents of the magnetic information, that is, "1" and "0" of the binary code do not have to be read accurately. For this reason, the peak hold circuit 132 detects the peak of the signals amplified by the amplification circuit 30 for a predetermined period of time, and holds the peak value. Then, the voltage level of the peak of the signals is read from the A/D port.

In this case, the peak hold circuit 132 is reset at regular intervals, and the voltage level is read multiple times for one magnetic record area. Whether the magnetic information is recorded or not is determined based on the comparison between the average or integrated value and the reference value.

The regenerated signal via the peak hold circuit 132 is input to the A/D port (MRCIN) of the microcomputer 2. According to the regenerated signal, the microcomputer 2 determines whether any magnetic information is recorded or not.

Description will hereunder be given of the operation during regeneration in the second embodiment of the record regeneration circuit in FIG. 28 with reference to waveform charts.

FIG. 28(a) is a waveform chart showing an example of signals which have just output from the amplification circuit; FIG. 28(b) is a waveform chart of the signal output from the MRCRESET port of the microcomputer 2; and FIG. 28(c) is a waveform chart of the signals input to the MRCIN port via the peak hold circuit.

As shown in FIG. 28(a), the signal which has just output from the amplification circuit 30 includes a clock signal which corresponds to the clock pulse, and a data signal which corresponds to the data pulse inserted into the first or second half of one period of the clock pulse according to the record data of "0" or "1". The clock signal is provided at the minus side and the data signal is provided at the plus side if an amplifier ground (2.3 V) is a reference.

If the H level signal is output from the MRCRESET port of the microcomputer 2, the analog switch 145 in FIG. 27 is turned on, and the peak hold circuit 132 is reset. When the output from the MRCRESET port becomes the L level, the peak hold circuit 132 starts detecting the minimum value of the amplifier output is started. On receipt of a signal which is smaller than the signal once held, the peak hold circuit 132 updates the held value to hold the smaller value as shown in FIG. 28(b). Thus, the peak hold circuit 132 detects and holds the minimum value of the amplifier output until the peak hold circuit 132 is reset again. The voltage level held by the peak hold circuit just before resetting is read from the A/D port. The peak hold circuit 132 is reset multiple times within the magnetic record area for one frame, and the voltage level is read multiple times.

Figure 29:
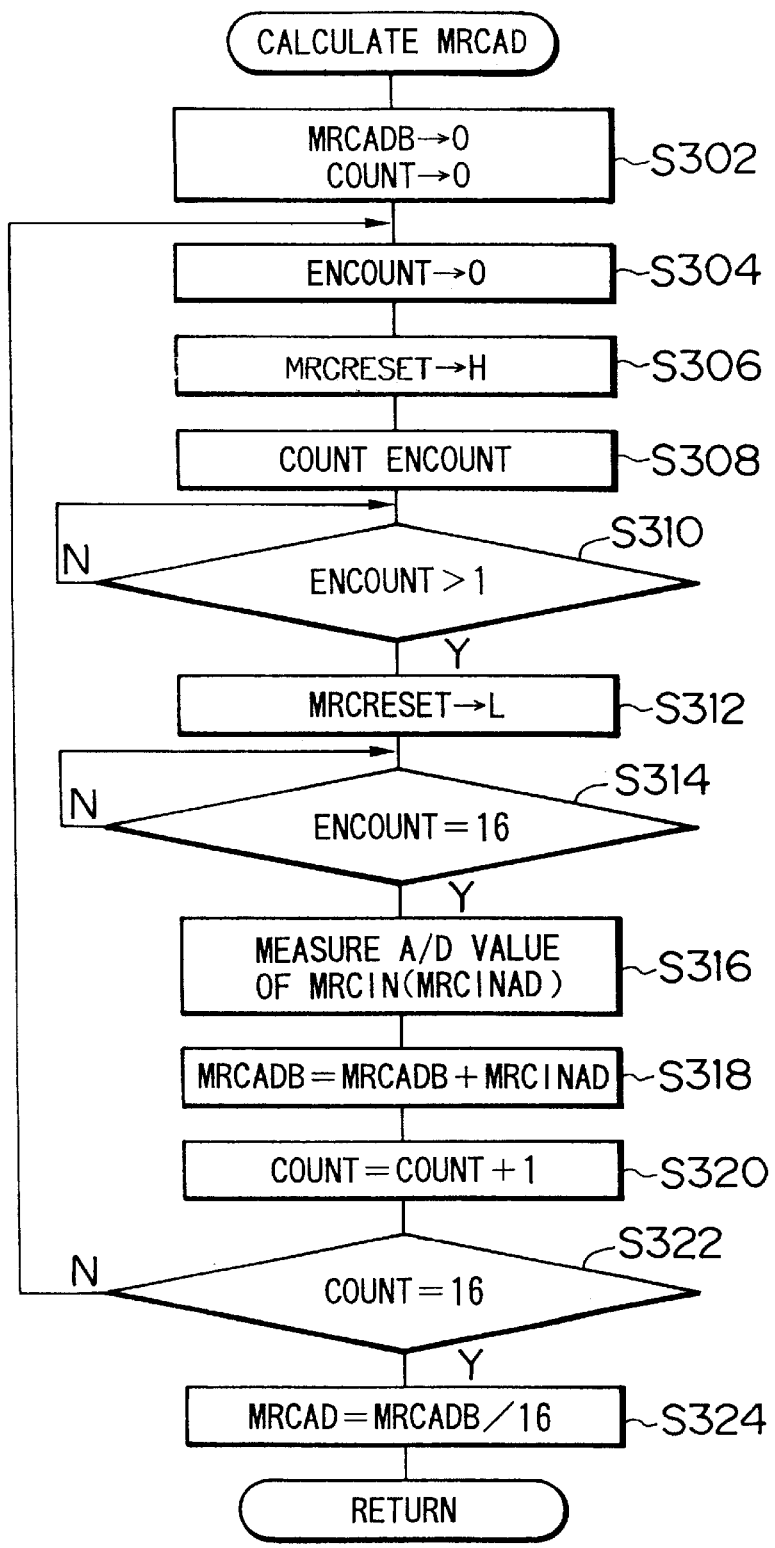
FIG. 29 is a flow chart showing the sub-routine of regenerated data (MRCAD) calculating process.

If the above-mentioned peak hold circuit 132 is used, the calculation of the regenerated data (MRCAD) (S51) in FIG. 17 is executed on the procedure described in FIG. 29.

As shown in FIG. 29, the integrated value of the A/D value (MRCADB) of MRCIN and the count value (COUNT) for counting the integration are initialized to "0" (S302). The count value (ENCOUNT) counting the encodement pulses for specifying the reset timing is initialized to "0" (S304), and then MRCRESET port is turned to the high (H) output (S306) to start counting ENCOUNT (S308). If ENCOUNT exceeds 1, MRCRESET port turns to low (L) output (S312).

Then, whether ENCOUNT corresponds to 16 or not is determined (S314), and the process is looped until ENCOUNT reaches 16. During this period, that is, for 16 encodement pulses, the peak hold circuit 132 continues to detect the peak (the minimum value).

When ENCOUNT is 16 at S314, the A/D value of MRCIN (MRCINAD) is measured (S316). The measured MRCINAD is added to an integrated value MRCADB so as to calculate a new MRCADB value (S318), and counts up the count of integration (COUNT) by 1 (S320).

Then, whether COUNT representing the number of integration corresponds to 16 or not is confirmed at S322, and the above-stated steps from S304 to S322 are repeated until COUNT reaches 16. After MRCINAD is measured 16 times and the integrated value MRCADB is obtained, MRCADB is divided by 16 to obtain the regenerated data (MRCAD) (S324).

Then, the process returns to the sub-routine of the MRC control shown in FIG. 17, and proceeds to S52.

The peak hold circuit 132 is reset multiple times (16 times) during regeneration of one magnetic record area, and the outputs of the peak hold circuit 132 are read multiple times. Then, the average of the outputs is compared with the reference value. Thus, the determination errors resulting from the irregular noise, etc. are prevented, and whether there any magnetic information is recorded or not can be determined accurately.

Figure 30:
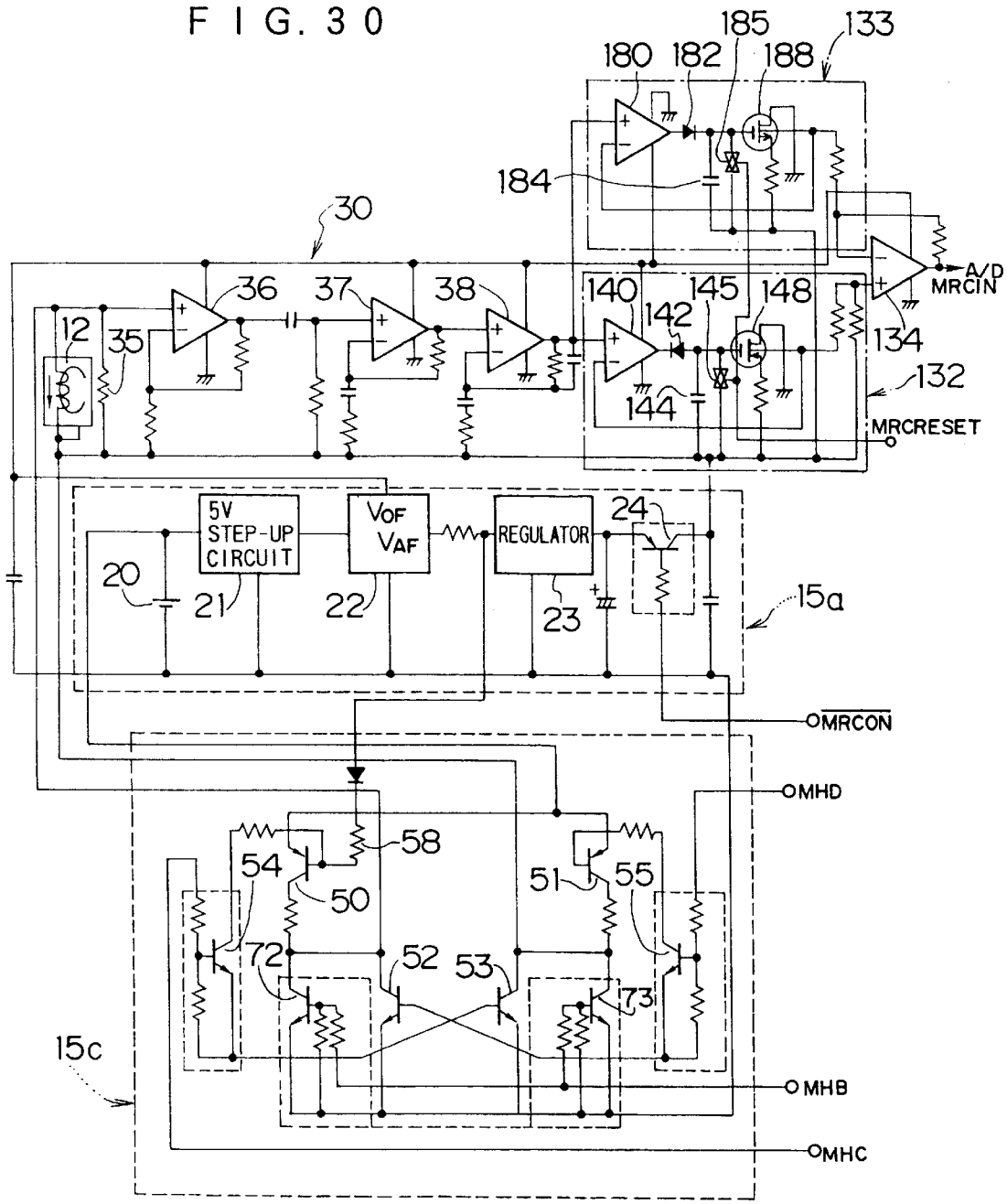
FIG. 30 is a circuit diagram showing the third embodiment of the recording and regenerating circuit.

FIG. 30 shows the third embodiment of the recording and regenerating circuit 15 shown in FIG. 1.

In the second embodiment described in FIG. 27, the circuit becomes valid if the noise from the motor is generated at one of the plus and minus sides. FIG. 30 shows an example of the construction of the recording and regenerating circuit which may be applied to the case when the noise of which polarity is unsettled is generated. Parts similar to those in the second embodiment described with reference to FIG. 27 are denoted by the same reference numerals, and they will not be described in detail.

As shown in FIG. 30, at the rear of the amplification circuit 30, there are provided in parallel the first peak hold circuit 133 which detects the maximum value of the signals and the second peak hold circuit 132 which detects the minimum value of the signals. In addition, a differential amplifier 134 is provided whose differential signals are outputs from the first and second peak hold circuits. The first peak hold circuit 133 consists of an operational amplifier 180, a diode 182, a condenser 184, an analog switch 185 and a MOS FET 188 as a buffer. The first peak hold circuit 133 is similar to the second peak hold circuit 132, and these two circuits are different only in the direction of the diode 182 and that the MOS FET 148 is a p-channel device and the MOS FET 188 is an n-channel device. The signals from the first peak hold circuit 133 are input to an inverting input terminal of the differential amplifier 134, and the signals from the second peak hold circuit 132 are input to a non-inverting input terminal of the differential amplifier 134. The differential amplifier output is output to the MRCIN port.

Figure 31:
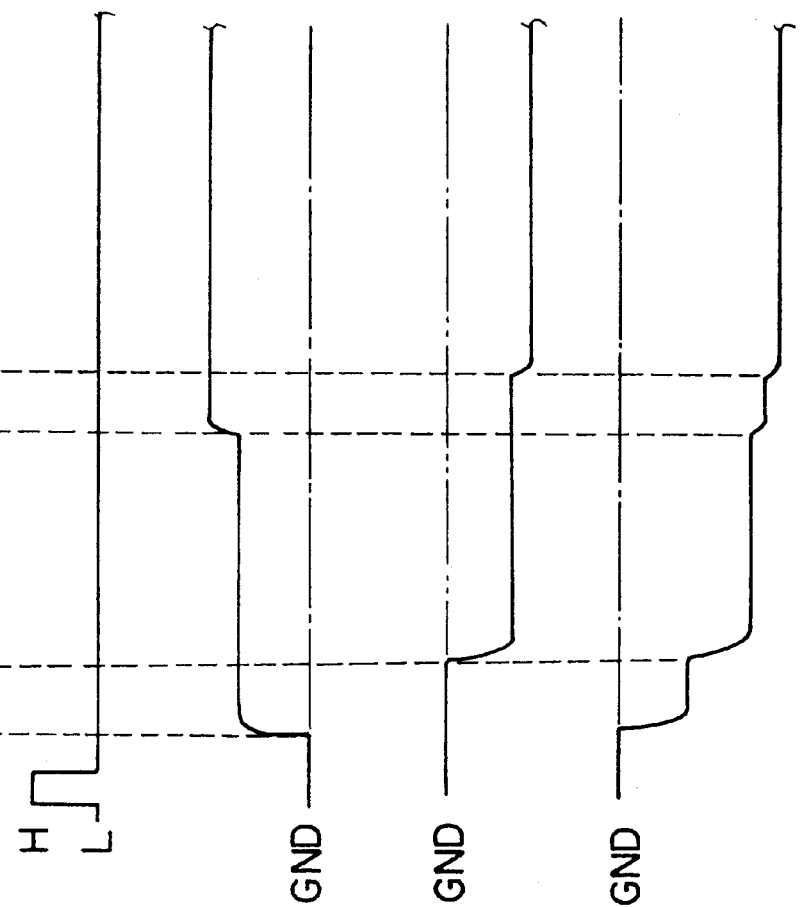
FIGS. 31(*a*), 31(*b*), 31(*c*), 31(*d*) and 31(*e*) are waveform charts for explaining the operation of the recording and regenerating circuit in FIG. 30.

FIG. 31(a) is a waveform chart showing an example of the signals which have just output from the amplification circuit 30; FIG. 31(b) is a waveform chart of a signal output from the MRCRESET port of the microcomputer 2; FIG. 31(c) is a waveform chart of signals output from the first peak hold circuit 133; FIG. 31(d) is a waveform chart of signals output from the second peak hold circuit 132; and FIG. 31(e) is a waveform chart of signals output from the differential amplifier 134 (gain 1) whose differential signals are shown in FIGS. 31(c) and 31(d).

The reading timing and the processing method are similar to those in the second embodiment, and they will not be described in detail.

As set forth hereinabove, according to the present invention, the number of turns of the coil in the regenerating magnetic head is small in order to make the magnetic head compact and low-priced. Since the number of turns of the coil is small, the magnetic head may be used in order to record the magnetic information. Moreover, the voltage level can be correctly read, and whether there is any magnetic information or not can be accurately determined. Since the noise resulting from a change in the film feed speed can be eliminated, the voltage level can be read correctly. Further, the noise can be prevented from coming into the regenerating circuit from the recording circuit during regenerating. After recording of the last magnetic information, the electric charge which is accumulated in proximity of the magnetic head is discharged, and then the non-magnetized area can be formed without fail, thereby preventing the recording errors caused by the oscillating current.

According to the present invention, the reference voltage is cut off from the amplification circuit and the driving power is supplied to the amplification circuit during recording, so that the amplification circuit can function as the comparator. Thus, even if the signal voltage is input to the amplification circuit during recording, the amplification circuit is not broken. For this reason, there is no need to provide a changeover switch for alternately connecting the recording circuit and the amplification circuit with respect to the coil, and an expensive protection circuit at the input stage of the amplification circuit, and therefore, the camera can be low-priced. In addition, the regenerated current flowing through the coil can be directly input to the amplification circuit, thereby obtaining the regenerated signal with low noise.

Furthermore, according to the present invention, the preparations for photographing can be made properly for the partial cartridge, which contains the photographic film with one or more of exposed frames and one or more of unexposed frames. If the preparations cannot be made properly, the photographing using the partial cartridge is prohibited in order to prevent a trouble such as double exposure.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising:

temperature measuring means for measuring temperature within said camera;

determination means for determining whether the temperature within the camera measured by said temperature measuring means is less than a predetermined reference temperature effecting a speed at which the photographic film is feeding; and prohibiting means for prohibiting photographing using the loaded film cartridge if said determination means determines that the temperature within said camera is less than the predetermined reference temperature and the loaded film cartridge is determined as being the partial cartridge;

wherein said prohibiting means does not prohibit photographing if the film cartridge which is loaded in the camera is not a partial film cartridge, even though the temperature within the camera is determined as below said reference temperature.

2. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising cartridge type detecting means for detecting a type of the loaded film cartridge;

determination means for determining whether the loaded film cartridge contains reversal film or not, according to the type of the loaded film cartridge detected by said cartridge type detecting means; and prohibiting means for prohibiting photographing using the loaded film cartridge if said determination means determines that the loaded film cartridge contains the reversal film and the loaded film cartridge is determined as being the partial cartridge;

wherein said prohibiting means does not prohibit photographing which uses the film cartridge if the film cartridge loaded in the camera is not a partial film cartridge.

3. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising:

speed measuring means for measuring speed at which the photographic film is feeding;

determination means for determining whether the film feed speed measured by said speed measuring means is less than a predetermined reference speed; and prohibiting means for prohibiting photographing using the loaded film cartridge if said determination means determines that the film feed speed measured by said speed measuring means is less than the predetermined reference speed and the loaded film cartridge is determined as being the partial cartridge;

wherein said prohibiting means does not prohibit photographing if the film cartridge which is loaded in the camera is not a partial film cartridge, even though the feeding speed is determined as below the predetermined feeding speed.

4. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising:

determination means for determining whether voltage of a battery in said camera is lower than a predetermined reference voltage while said photographic film is feeding or whether current of a motor which feeds the photographic film is higher than a predetermined reference current; and prohibiting means for prohibiting photographing using the loaded film cartridge if said determination means determines that the voltage of said battery is lower than the predetermined reference voltage or the current of the motor is higher than the predetermined reference current, and if the loaded film cartridge is determined as being the partial cartridge;

wherein said prohibiting means does not prohibit photographing if the film cartridge which is loaded in the camera is determined as not a partial film cartridge, even though the voltage of the battery is determined as below the predetermined reference voltage, or the current of the motor is determined as above the predetermined reference current.

5. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising more than two of following four determination means:

first determination means for measuring temperature within said camera and making a first determination that the measured temperature is less than a predetermined reference temperature effecting a speed at which the photographic film is feeding;

second determination means for detecting a type of the loaded film cartridge and making a second determination that the loaded film cartridge contains reversal film;

third determination means for measuring the film feed speed and making a third determination that the measured film feed speed is less than a predetermined reference speed;

fourth determination means for making a fourth determination that voltage of a battery in said camera is lower than a predetermined reference voltage while said photographic film is feeding or current of a motor which feeds the photographic film is higher than a predetermined referenced current;

wherein said camera further comprises prohibiting means for prohibiting photographing using the loaded film cartridge if at least two of said four determinations are made by said determination means and the loaded film cartridge is determined as being the partial cartridge; and said prohibiting means do not prohibit photographing if the film cartridge which is loaded in the camera is determined as not a partial film cartridge, even though said two or more determinations have been performed.

6. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising:

a temperature measuring device operative to measure temperature within said camera; and a processing unit operative to determine whether the temperature within the camera measured by said temperature measuring device is less than a predetermined reference temperature effecting a speed at which the photographic film is feeding and prohibiting photographing using the loaded film cartridge if said processing unit determines that the temperature within said camera is less than the predetermined reference temperature and the loaded film cartridge is determined as being the partial cartridge.

7. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising:

a cartridge type detecting device operative to detect a type of the loaded film cartridge; and a processing unit operative to determine whether the loaded film cartridge contains reversal film, according to the type of the loaded film cartridge detected by said cartridge type detecting device and prohibiting photographing using the loaded film cartridge if said processing unit determines that the loaded film cartridge contains the reversal film and the loaded film cartridge is determined as being the partial cartridge.

8. A camera which determines whether a film cartridge loaded in said camera is a partial cartridge, containing photographic film having an exposed frame and an unexposed frame, or not, and feeds the photographic film from the loaded film cartridge up to a first unexposed frame if determining that the loaded film cartridge is the partial cartridge; said camera comprising:

a processing unit operative to determine whether voltage of a battery in said camera is lower than a predetermined reference voltage while said photographic film is feeding or whether current of a motor which feeds the photographic film is higher than a predetermined reference current and prohibiting photographing using the loaded film cartridge if said processing unit determines that the voltage of said battery is lower than the predetermined reference voltage or the current of the motor is higher than the predetermined reference current, and if the loaded film cartridge is determined as being the partial cartridge.

* * * * *